US010129195B1

(12) United States Patent
Jakobsson

(10) Patent No.: US 10,129,195 B1
(45) Date of Patent: *Nov. 13, 2018

(54) TERTIARY CLASSIFICATION OF COMMUNICATIONS

(71) Applicant: ZapFraud, Inc., Portola Valley, CA (US)

(72) Inventor: Bjorn Markus Jakobsson, Portola Valley, CA (US)

(73) Assignee: ZAPFRAUD, INC., Portola Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/786,172

(22) Filed: Oct. 17, 2017

Related U.S. Application Data

(63) Continuation of application No. 15/235,058, filed on Aug. 11, 2016, which is a continuation of application No. 13/765,630, filed on Feb. 12, 2013, now Pat. No. 9,473,437.

(60) Provisional application No. 61/597,972, filed on Feb. 13, 2012, provisional application No. 61/729,991, filed on Nov. 26, 2012.

(51) Int. Cl.
*G06F 15/16* (2006.01)
*H04L 12/58* (2006.01)
*H04L 29/06* (2006.01)

(52) U.S. Cl.
CPC .......... *H04L 51/12* (2013.01); *H04L 63/1483* (2013.01); *H04L 63/1491* (2013.01)

(58) Field of Classification Search
CPC . H04W 24/00; G06Q 10/107; H04L 63/1408; H04L 51/12
See application file for complete search history.

(56) References Cited

U.S. PATENT DOCUMENTS

| 6,161,130 | A | 12/2000 | Horvitz |
| 6,574,658 | B1 | 6/2003 | Gabber |
| 6,721,784 | B1 | 4/2004 | Leonard |
| 7,293,063 | B1 | 11/2007 | Sobel |
| 7,299,261 | B1 | 11/2007 | Oliver |
| 7,644,274 | B1 | 1/2010 | Jakobsson |

(Continued)

OTHER PUBLICATIONS

Author Unknown, SpamKilling, What is AntiSpam?, downloaded from "https://web.archive.org/web/20100411141933/http:/www.spamkilling.com:80/home_html.htm", Apr. 11, 2010.

(Continued)

*Primary Examiner* — Aftab N. Khan
(74) *Attorney, Agent, or Firm* — Schwabe Williamson & Wyatt, PC

(57) ABSTRACT

Information associated with a plurality of electronic communications between a first entity and a second entity is obtained. First and second determinations are performed that the number of communications in the plurality of electronic communications exceeds a first threshold, and that the plurality of electronic communications were exchanged during a period of time that exceeds a second threshold. A classification is performed on a received electronic communication based at least in part on the first determination and the second determination, the electronic communication is assigned one of three different classifications: good, bad, and undetermined. At least one action is performed based at least in part on the performed classification.

23 Claims, 10 Drawing Sheets

(56) References Cited

U.S. PATENT DOCUMENTS

| | | | |
|---|---|---|---|
| 7,809,795 B1* | 10/2010 | Cooley | G06Q 10/107 709/200 |
| 7,814,545 B2 | 10/2010 | Oliver | |
| 7,873,996 B1* | 1/2011 | Emigh | H04L 51/12 726/22 |
| 7,899,213 B2 | 3/2011 | Otsuka | |
| 7,899,866 B1 | 3/2011 | Buckingham | |
| 7,921,063 B1* | 4/2011 | Quinlan | G06F 17/20 705/76 |
| 8,010,614 B1 | 8/2011 | Musat | |
| 7,917,655 B1 | 11/2011 | Coomer | |
| 8,079,087 B1* | 12/2011 | Spies | G06F 17/30873 709/205 |
| 8,131,655 B1 | 3/2012 | Cosoi | |
| 8,255,572 B1 | 8/2012 | Coomer | |
| 8,489,689 B1 | 7/2013 | Sharma | |
| 8,527,436 B2 | 9/2013 | Salaka | |
| 8,566,938 B1 | 10/2013 | Prakash | |
| 8,667,069 B1 | 3/2014 | Connelly | |
| 8,719,940 B1 | 5/2014 | Higbee | |
| 8,752,172 B1 | 6/2014 | Dotan | |
| 8,832,202 B2 | 9/2014 | Yoshioka | |
| 8,918,466 B2* | 12/2014 | Yu | H04L 51/28 709/206 |
| 8,984,640 B1 | 3/2015 | Emigh | |
| 9,031,877 B1 | 5/2015 | Santhana | |
| 9,060,057 B1 | 6/2015 | Danis | |
| 9,245,115 B1 | 1/2016 | Jakobsson | |
| 9,277,049 B1 | 3/2016 | Danis | |
| 9,338,287 B1 | 5/2016 | Russo | |
| 9,471,714 B2 | 10/2016 | Owasaki | |
| 9,473,437 B1 | 10/2016 | Jakobsson | |
| 9,760,644 B2 | 9/2017 | Khvostichenko | |
| 2002/0138271 A1 | 9/2002 | Shaw | |
| 2003/0023736 A1 | 1/2003 | Abkemeier | |
| 2003/0229672 A1 | 12/2003 | Kohn | |
| 2003/0236845 A1 | 12/2003 | Pitsos | |
| 2004/0176072 A1 | 9/2004 | Gellens | |
| 2004/0177120 A1* | 9/2004 | Kirsch | H04L 29/06 709/206 |
| 2004/0203589 A1 | 10/2004 | Wang | |
| 2005/0033810 A1 | 2/2005 | Malcolm | |
| 2005/0060643 A1 | 3/2005 | Glass | |
| 2005/0076084 A1 | 4/2005 | Loughmiller | |
| 2005/0080855 A1* | 4/2005 | Murray | H04L 51/12 709/206 |
| 2005/0182735 A1 | 8/2005 | Zager | |
| 2005/0188023 A1 | 8/2005 | Doan | |
| 2005/0216587 A1 | 9/2005 | John | |
| 2005/0223076 A1 | 10/2005 | Barrus | |
| 2005/0235065 A1 | 10/2005 | Le | |
| 2005/0257261 A1 | 11/2005 | Shraim | |
| 2006/0004772 A1 | 1/2006 | Hagan | |
| 2006/0015563 A1 | 1/2006 | Judge | |
| 2006/0026242 A1 | 2/2006 | Kuhlmann | |
| 2006/0031306 A1 | 2/2006 | Haverkos | |
| 2006/0053490 A1 | 3/2006 | Herz | |
| 2006/0149821 A1 | 7/2006 | Rajan | |
| 2006/0168329 A1 | 7/2006 | Tan | |
| 2006/0195542 A1 | 8/2006 | Nandhra | |
| 2006/0206713 A1 | 9/2006 | Hickman | |
| 2006/0224677 A1 | 10/2006 | Ishikawa | |
| 2006/0253597 A1 | 11/2006 | Mujica | |
| 2006/0259558 A1 | 11/2006 | Yen | |
| 2006/0265498 A1 | 11/2006 | Turgeman | |
| 2007/0019235 A1 | 1/2007 | Lee | |
| 2007/0027992 A1* | 2/2007 | Judge | G06Q 10/107 709/227 |
| 2007/0107053 A1 | 2/2007 | Shraim | |
| 2007/0101423 A1 | 5/2007 | Oliver | |
| 2007/0130618 A1 | 6/2007 | Chen | |
| 2007/0143432 A1 | 6/2007 | Klos | |
| 2007/0192169 A1 | 8/2007 | Herbrich | |
| 2007/0198642 A1 | 8/2007 | Malik | |
| 2007/0239639 A1* | 10/2007 | Loughmiller | G06Q 10/107 706/20 |
| 2007/0271343 A1 | 11/2007 | George | |
| 2007/0299915 A1 | 12/2007 | Shraim | |
| 2007/0299916 A1 | 12/2007 | Bates | |
| 2008/0004049 A1 | 1/2008 | Yigang | |
| 2008/0046970 A1 | 2/2008 | Oliver | |
| 2008/0104235 A1 | 5/2008 | Oliver | |
| 2008/0141374 A1 | 6/2008 | Sidiroglou | |
| 2008/0175266 A1* | 7/2008 | Alperovitch | G06F 21/554 370/465 |
| 2008/0178288 A1 | 7/2008 | Alperovitch | |
| 2008/0050014 A1 | 9/2008 | Bradski | |
| 2008/0235794 A1 | 9/2008 | Bogner | |
| 2008/0276315 A1 | 11/2008 | Shuster | |
| 2008/0290154 A1 | 11/2008 | Barnhardt | |
| 2009/0064330 A1 | 3/2009 | Shraim | |
| 2009/0077617 A1* | 3/2009 | Levow | H04L 51/12 726/1 |
| 2009/0089859 A1 | 4/2009 | Cook | |
| 2009/0210708 A1 | 8/2009 | Chou | |
| 2009/0228583 A1 | 9/2009 | Pocklington | |
| 2009/0252159 A1 | 10/2009 | Lawson | |
| 2009/0292781 A1 | 11/2009 | Teng | |
| 2009/0319629 A1 | 12/2009 | DeGuerre | |
| 2010/0030798 A1 | 2/2010 | Kumar | |
| 2010/0043071 A1 | 2/2010 | Wang | |
| 2010/0070761 A1 | 3/2010 | Gustave | |
| 2010/0115040 A1 | 5/2010 | Sargent | |
| 2010/0145900 A1 | 6/2010 | Zheng | |
| 2010/0287246 A1 | 11/2010 | Klos | |
| 2010/0299399 A1 | 11/2010 | Wanser | |
| 2010/0313253 A1 | 12/2010 | Reiss | |
| 2011/0087485 A1 | 4/2011 | Maude | |
| 2011/0191847 A1 | 8/2011 | Davis | |
| 2011/0271349 A1 | 11/2011 | Kaplan | |
| 2012/0030293 A1 | 2/2012 | Bobotek | |
| 2012/0124664 A1* | 5/2012 | Stein | G06F 15/16 726/22 |
| 2012/0167233 A1* | 6/2012 | Gillum | H04L 51/12 726/29 |
| 2012/0227104 A1 | 9/2012 | Sinha | |
| 2012/0246725 A1 | 9/2012 | Osipkov | |
| 2012/0278694 A1 | 11/2012 | Washio | |
| 2013/0067012 A1 | 3/2013 | Matzkel | |
| 2013/0081142 A1 | 3/2013 | McDougal | |
| 2013/0083129 A1 | 4/2013 | Thompson | |
| 2013/0128883 A1 | 5/2013 | Lawson | |
| 2013/0217365 A1 | 8/2013 | Ramnani | |
| 2013/0333028 A1 | 12/2013 | Hagar | |
| 2013/0346528 A1 | 12/2013 | Shinde | |
| 2014/0123279 A1 | 5/2014 | Bishop | |
| 2014/0230061 A1 | 8/2014 | Higbee | |
| 2014/0250506 A1 | 9/2014 | Hallam-Baker | |
| 2015/0030156 A1 | 1/2015 | Perez | |
| 2015/0067833 A1 | 3/2015 | Verma | |
| 2015/0081722 A1 | 3/2015 | Terada | |
| 2016/0104132 A1 | 4/2016 | Abbatiello | |
| 2017/0091274 A1 | 3/2017 | Guo | |

OTHER PUBLICATIONS

Author Unknown, SpamRestraint.com: How does it work?, downloaded from "https://web.archive.org/web/20050206071926/http://www.spamrestraint.com:80/moreinfo.html", Feb. 6, 2005.

Author Unknown, Tagged Message Delivery Agent (TMDA), downloaded from "http://web.archive.org/web/20160122072207/http://www.tmda.net/", Jan. 22, 2016.

Author Unknown, UseBestMail provides a mechanism for validating mail from non-UseBestMail correspondents., downloaded from "https:/ /web.archive.org/web/200901 06142235/http:/ Iwww.usebestmail.com/UseBestMail/Challenge _Response.html", Jan. 6, 2009.

Author Unknown, V@nquish Labs, "vqNow: How It Works", downloaded from "https://web.archive.org/web/20130215074205/http:/www.vanquish.com:80/products/products _ how _it_ works.php? product=vqnow", Feb. 15, 2013.

(56) References Cited

OTHER PUBLICATIONS

Author Unknow, V@nquishLabs, How it Works: Features, downloaded from "https://web.archive.org/web/20081015072416/http://vanquish.com/features_how_it_works.shtml", Oct. 15, 2008.
Author Unknown, What is Auto Spam Killer, downloaded from "https://web.archive.org./web/20090215025157 / http:I/knockmail.com:80/support/descriptionask.html", Feb. 15, 2009.
Author Unknown, White List Email (WLE), downloaded from "https://web.archive.org/web/20150912154811/http:www.rfc1149.neVdevel/wle.html", Sep. 12, 2015.
Bjorn Markus Jakobsson, U.S. Appl. No. 14/487,989 entitled "Detecting Phishing Atiempts", filed Sep. 16, 2014.
Brad Templeton, "Proper principles for Challenge/Response antispam systems", downloaded from "http://web.archive.org/web/2015090608593/http://www.templetons.com/brad/spam/challengeresponse.html", Sep. 6, 2015.
Danny Sleator, "BLOWBACK: A Spam Blocking System", downlaoded from "https://web.archive.org/web/20150910031444/http://www.cs.cmu.edu/~sleator/blowback", Sep. 10, 2015.
David A Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.
David A. Wheeler, "Countering Spam with Ham-Authenticated Email and the Guarded Email Protocol", article last revised Sep. 11, 2003; downloaded from "https://web.archive.org/web/20150915073232/http:lwww.dwheeler.com/guarded-email/guarded-email.html", captured Sep. 15, 2015.
E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.
Fleizach et al., Slicing Spam with Occam's Razo(, published Jun. 10, 2007, downloaded from "https://web.archive.org/web/20140214225525/http://csetechrep.ucsd.edu/DiensUUI/2.0/Describe/ncstrl.ucsd_cse/C 2007-0893", captured Feb. 14, 2014.
James Thornton, "Challenge/Response at the SMTP Level", downloaded from "https://web.archive.org/web/20140215111642/http://original.jamesthomton.com/writing/challenge-response-at-smtp-level.html", Feb. 15, 2014.
Karsten M. Self, "Challenge-Response Anti-Spam Systems Considered Harmful", downloaded from "llp://linuxmafia.com/faq/Mail/challenge-response.html", last updated Dec. 29, 2003.
M. Jakobsson and H. Siadali. SpoofKiller: You can Teach People How to Pay, but Not How to Pay Attention. In Proceedings of the 2012 Workshop on Socio-Technical Aspects in Security and Trust (ST AST), ST AST '12, pp. 3-10, Washington, DC, USA, 2012. IEEE Computer Society.
Marco Paganini, Active Spam Killer, "How It Works", downloaded from "https://web.archive.org/web/20150616133020/http:/a-s-k.sourceforge.net:80/howitworks.html", Jun. 16, 2015.
NIST. Usability of Security. http://csrc.nist.gov/security-usability/HTMUresearch.html.
Peter Simons, "mapSoN 3.x User's Manual", downloaded from "hllps://web.archive.org/web/20140626054320/hllp:/mapson.sourceforge.net/", Jun. 26, 2014.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
Ronald L. Rivest, "RSF Quickstart Guide", Sep. 1, 2004.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.
Ahonen-Myka et al., "Finding Co-Occurring Text Phrases by Combining Sequence and Frequent Set Discovery", Proceedings of 16th International Joint Conference of Artificial Intelligence IJCAI-99 Workshop on Text Mining: Foundations, Techniques and Application (Jul. 31, 1999), 9 pages.
A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.
Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.
Author Unknown, "BABASTIK: AntiSpam Personal", downloaded from "https://web.archive.org/web/20101031061734/babastik.com/AntiSpam-Personal", Oct. 31, 2010.
Author Unknown, "bluebottle—trusted delivery", downloaded from "https://web.archive.org/web/20140715223712/https://bluebottle.com/trusted-delivery.php", Jul. 15, 2014.
Author Unknown, "Federal Court Denies Attempt by Mailblocks, Inc. to Shut Down Spamarrest LLC", downloaded from "http://www.spamarrest.com/pr/releases/20030611.jsp", Seattle, WA, Jun. 11, 2003.
Author Unknown, "First of all, Your Software is Excellent", downloaded from "https://web.archive.org/web/2012018207 4130/http://www.spamresearchcenter.com/", Aug. 12, 2012.
Author Unknown, "Frequently asked questions regarding Spamboomerang: Test Drive how SPAM Boomerang treats unknown senders", downloaded from "https://web.archive.org/web/20080719034305/http:/www.triveni.eom.au/Spamboomerang/Spam_Faq.html", Jul. 19, 2008.
Author Unknown, "Junk Mail Buffering Agent", downloaded from http://www.ivarch.com/programs/jmba.shtml, Jun. 2005.
Author Unknown, "No Software to Install", downloaded from "https://web.archive.org/web/201002095356/http://www.cleanmymailbox.com:80/howitworks.html", Oct. 2, 2010.
Author Unknown, "Rejecting spam with a procmail accept list", downloaded from "https://web.archive.org/web/20160320083258/http:/angel.nel/-nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.soflwaredevelopment.net.au :80/pge_steven.htm", Jun. 7, 2014.
Author Unknown, 0Spam.com, Frequently Asked Questions, downloaded from "https://web.archive.org/web/20150428181716/http://www.Ospam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "hllps://web.archive.org/web/20150813112933/hllp:/clifford.ac/soflware.html", Aug. 13, 2015.
Author Unknown, ASB AntiSpam official home page, downloaded from "https://web .archive.org/web/20080605074520/htlp ://asbsoft.netwu .com:80/index. html", Jun. 5, 2008.
Author Unknown, Boxbe, Wikipedia, Nov. 17, 2016, https://en.wikipedia.org/wiki/Boxbe ?wprov=sfsi 1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, Captcha: Telling Humans and Computers Apart Automatically, downloaded from "https://web.archive.org/web/20160124075223/htlp:/www.captcha.net/", Jan. 24, 2016.

(56) References Cited

OTHER PUBLICATIONS

Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.

Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69 PKU5", May 20, 2015.

Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.

Author Unknown, Home Page for "Countering Spam with Ham-Authenticated Email and the Guarded Email Protocol", downloaded from https:I/web.archive.org/webl201509130751301http:1www.dwheeler.com/guarded-emaill, Sep. 13, 2015.

Author Unknown, Home: About.com, downloaded from "https://web.archive.org/web/20110201205543/quarantinemail.coml" Feb. 1, 2011.

Author Unknown, How ChoiceMail Works, downloaded from "https://web.archive.org/web/20160111013759/http:/www.digiportal.com:80/products/how-choicemail-works.html", Jan. 11, 2016.

Author Unknown, How Mail Unknown works., downloaded from "https://web.archive.org/web/20100123200126/http://www.mailunknown.com:80/HowMailUnknownWorks.asp#VerifyValidate", Jan. 23, 2010.

Author Unknown, Joe Maiman—Sendmail Page, downloaded from "htlps://web.archive.org/web/20150820074626/htlp:/www.jmaimon.com/sendmail/" Aug. 20, 2015.

Author Unknown, Kens Spam Filter 1.40, downloaded from "htlps://web.archive.org/web/20080317184558/http://www.kensmail.net:80/spam.html", Mar. 17, 2008.

Author Unknown, mailcircuit.com, Secure: Spam Protection, downloaded from hllps://web.archive.org/web/20131109042243/hllp:/www.mailcircuit.com/securef, Nov. 9, 2013.

Author Unknown, mailDuster, Tour 1: Show me how mailDuster blocks spam, downloaded from "hllps://web.archive.org/web/20070609210003/http://www.mailduster.com:80/lour1.phlml", Jun. 9, 2007.

Author Unknown, mailDuster, Tour 2: But how do my friends and colleagues send me email?, downloaded from "https:I/Web.archive.orglwebI200706092100391http://www.mailduster.com:80Itour2.phtml", Jun. 9, 2007.

Author Unknown, mailDuster, Tour 3: How do I manage this "Allow and Deny List"?, downloaded from "https://web.archive.org/web/20070610012141 /http://www.mailduster.com:80/tour3.phtml", Jun. 10, 2007.

Author Unknown, mailDuster, User Guide, downloaded from "https://web.archive.org/WebI20070612091602/http:/www.mailduster.com:80Iuserguide.phtml", Jun. 12, 2007.

Author Unknown, myprivacy.ca, "Welcome to myprivacy.ca: The simple yet effective whois-harvester-buster", downloaded from https://web.archive.orgIwebl20160204100135Ihttps:lwww.myprivacy.caf, Feb. 4, 2016.

Author Unknown, PermitMail, Products: The most advanced email firewall available for your business, downloaded from "https://web.archive.org/web/20160219151855/http://ipennitmail.com/products/", Feb. 19, 2016.

Author Unknown, Petmail Design, downloaded from "hllps:/ /web.archive.org/web/20150905235136if_/hllp :/petmail .lothar.com/design .html", Jul. 2005.

Author Unknown, PostShield.net, Challenge and Response, downloaded from "https://web.archive.org/web/20080117111334/http://www.postshield.net:80/ChallengeAndResponse.aspx", Jan. 17, 2008.

Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.

Author Unknown, Product Information, "Sender Validation is the solution to your company's spam problem.", downloaded from "https://web.archive.org/web/20140413143328/http:/www.spamlion.com:80/Products.asp", Apr. 13, 2014.

Author Unknown, qconfirm—How it works, downloaded from https://web.archive.org/web/20150915060329/http:/smarden.org/qconfirm/technical.html, Sep. 15, 2015.

Author Unknown, Say Goodbye to Email Overload, downloaded from "https://web.archive.org/web/20160119092844/http://www.boxbe.com:80/how-it-works", Jan. 19, 2016.

Author Unknown, sendio, "Inbox Security. Threats eliminated with a layered technology approach.", downloaded from "https://web.archive.org/web/20140213192151 /http:/www.sendio.com/solutions/security/", Feb. 13, 2014.

Author Unknown, SPAM Pepper, Combatting Net Spam, downloaded from https://web.archive.org/web/20141002210345/http://www.spampepper.com:80/spampepper-comf, Oct. 2, 2014.

Author Unknown, Spam Snag, Stop Unsolicited Emails forever!, downloaded from "https://web.archive.org/web/20081220202500/http://www.spamsnag.com:80/how.php", Dec. 20, 2008.

Author Unknown, Spam: Overview, downloaded from "https://web.archive.org/web/20090107024207/http:/www.spamwall.neUproducts.htm", Jan. 7, 2009.

Author Unknown, SpamBlocks is a Web based Mail filtering service which integrates with your existing mailbox., downloaded from "https://web.archive.org/web/20090107050428/http:/www.spamblocks.net/howitworks/detailed_system_ overview .php", Jan. 7, 2009.

Author Unknown, SpamCerbere.com, downloaded from "https://web.archive.org/web/20070629011221/http:/www.spamcerbere.com:80/en/howitworks.php", Jun. 29, 2007.

Author Unknown, SPAMjadoo: Ultimate Spam Protection, downloaded from "https://web.archive.org/web/20140512000636/http:/www.spamjadoo.com:80/esp-explained .htm" May 12, 2014.

\* cited by examiner

⎱702        ⎱704
            my name is      I am long lost    distant    will    lawyer    solicitor    relative ⎱ 706 huge sum    ,000,    ,000. ⎱ 708

⎱710
    transfer    transferred    transfered your account    bank details ⎱ 712 urgent    urgently    immediately    right now ⎱ 714

Hi, my name is Mr. James Smith, and I represent your long lost cousin, who recently died.

He has left you a huge sum of money. I need to transfer the money to your account immediately.

FIG. 7B

TERTIARY CLASSIFICATION OF COMMUNICATIONS

CROSS REFERENCE TO OTHER APPLICATIONS

This application is a continuation of co-pending U.S. patent application Ser. No. 15/235,058, entitled TERTIARY CLASSIFICATION OF COMMUNICATIONS, filed Aug. 11, 2016 which is a continuation of U.S. patent application Ser. No. 13/765,630, entitled TERTIARY CLASSIFICATION OF COMMUNICATIONS, filed Feb. 12, 2013, which issued on Oct. 18, 2016 as U.S. Pat. No. 9,473,437, both of which are incorporated herein by reference for all purposes, which claim priority to U.S. Provisional Patent Application No. 61/597,972, entitled PROTECTING COMPUTER AND OTHER DEVICE USERS, filed Feb. 13, 2012 and to U.S. Provisional Patent Application No. 61/729,991, entitled DETERMINING RISK EXPOSURE AND AVOIDING FRAUD, filed Nov. 26, 2012, both of which are incorporated herein by reference for all purposes.

BACKGROUND OF THE INVENTION

Individuals increasingly use electronic mail to communicate with one another for personal and business reasons. Unfortunately, unscrupulous individuals can use electronic mail for nefarious purposes, such as to send unwanted advertising email (e.g., SPAM) and perpetrate fraud against victims. Existing techniques for protecting legitimate email users generally rely on the blacklisting of certain terms (e.g., "porn"), where the presence of a blacklisted term in a message automatically results in the classification of the message as SPAM. Such techniques can be readily defeated by the unscrupulous individual. As one example, the unscrupulous individual may use terms that a human would recognize, such as "p0rn" or "p.o.r.n," but might not appear on a blacklist. More sophisticated approaches are also being undertaken by unscrupulous individuals to defeat blacklisting and other protections. There therefore exists an ongoing need to protect against the victimization of legitimate email users.

BRIEF DESCRIPTION OF THE DRAWINGS

Various embodiments of the invention are disclosed in the following detailed description and the accompanying drawings.

FIG. 7A depicts an example of a collection of terms.

FIG. 7B shows an example of a fraudulent message that would be detected based on the collection of terms depicted in FIG. 7A.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
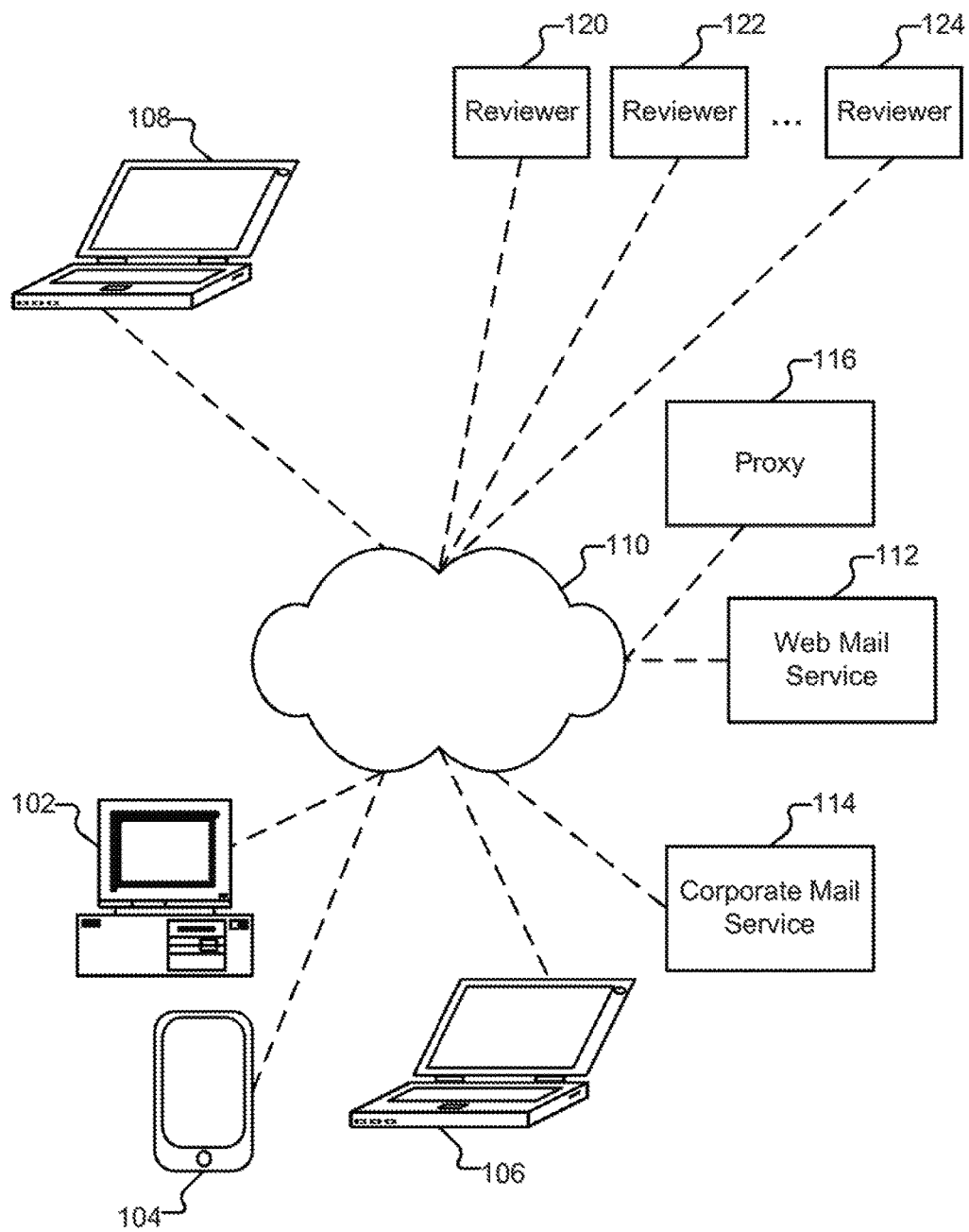
FIG. 1 illustrates an embodiment of an environment in which users of computer and other device are protected from communications sent by unscrupulous entities.

FIG. 1 illustrates an embodiment of an environment in which users of computer and other devices are protected from communications sent by unscrupulous entities. In the environment shown, a user of client device 102 (hereinafter referred to as "Alice") has an email account provided by web mail service provider 112. Alice visits provider 112's website with her computer (via one or more networks/network types, depicted collectively in FIG. 1 as a single network cloud 110) to read and write email. Alice also accesses her email account via mobile phone 104. A user of client device 106 (hereinafter referred to as "Bob") has an email account provided by his employer (i.e., hosted by corporate mail server 114) and also has an account with provider 112.

A nefarious individual (hereinafter referred to as "Charlie") uses client device 108 to perpetrate fraud on unsuspecting victims. In particular, Charlie is a member of a criminal organization that engages in a variety of email scams. One example scam is a "Nigerian scam" (also referred to herein as a "419 scam"), in which criminals contact unsuspecting Internet users with offers, requests, or opportunities for relationships, with the goal of requesting money from the victims—whether within the initial contact email, but also potentially at a future point (e.g., after multiple communications have been exchanged). Nigerian scams are believed to have originated in Nigeria (hence the name), but are now practiced from many places in the world.

While in principle anybody could fall victim to a 419 scam, some Internet users are more prone to such scams than others, and many are repeat victims. A particular individual may be the victim of such a scam due to having a personality or needs that make him/her particularly vulnerable to the scam (e.g., an older person living alone). The individual may also be the victim of the scam due to poor security practices by which these users unwittingly invite abuse by sharing their contact information in a way that allows scammers to find it. Furthermore, the names and contact information of these victims may be sold to other scammers, or reused by a successful scammer, due to the high probability of re-victimization.

A 419 scam tends to rely to a larger extent than other scams on social engineering. In contrast to typical SPAM messages which may contain readily blacklistable terms like "porn," one of the reasons that a 419 scam message is successful at tricking victims is because it appears to be a legitimate conversational message. Terms frequently present in a 419 scam message, such as "dollars" or "account" are also very prevalent in legitimate email. Further, people who are about to fall for a 419 scam may be unwilling to believe that they are being tricked, because they want to believe in the message that the scammer provides them. This makes it difficult for friends and family to help protect victims, as the victims do not believe they are being victimized. The degree of possible customization of scam messages makes it particularly difficult for existing email filters to provide sufficient protection, as evidenced by the ongoing success of such scams.

Described herein are techniques for protecting vulnerable users from malicious entities such as Charlie. In particular, as will be described in more detail below, communications are examined and classified by a classification platform 200, which can be operated as a single, standalone device, and can also be at least partially incorporated into a variety of the components shown in FIG. 1.

In addition to protecting against 419 scams, a wide array of other structurally related abuses, such as forms of cyber bullying, abuse by sexual predators, and in general, receipt of inappropriate or threatening information or messages, can be protected against. As will be described in more detail below, depending on the nature of the problems typically facing a given vulnerable user, and the severity of these problems, different configurations can be selected. As one example, platform 200 can determine the extent to which different abuses are covered by different parameter choices for a given user after reviewing some email traffic to and from the user in question, by running for a period of time, and/or by statistical methods that compare the user to similar users using the technology. It is possible to start with one configuration and change to another configuration if the first one is not appropriate, whether, e.g., because it is believed to remove desired communications or because it fails to remove communication that is a risk to the vulnerable user. This can be determined among other things from direct feedback from the protected vulnerable user; by manual or automatic scrutiny of quarantined messages, where it is determined what portion of this traffic was legitimate; and/or by scrutiny of the contents and quantity of the mail that is identified as bad. This provides an opportunity to change the settings over time to make them more appropriate for a given protected user, or to adopt the protection features to a changing problem, as the circumstances and exposure of the protected user change.

The techniques described herein can be incorporated into a variety of systems, in a variety of ways, and in various combinations. For example, Alice's web browser (e.g., on client 102 or client 104) can be configured to use a plugin whenever she accesses mail service 112. The plugin can be configured to perform at least some of the techniques described herein as being performed by platform 200. As another example, a client-side filter can be included on client device 106 and configured to scan/filter all, or a portion of the incoming/outgoing traffic of the device (e.g., traffic between corporate mail service 114 and/or web mail service 112, irrespective of what type of mail client is used by Bob to access his mail). In yet other embodiments, a regular mail client (e.g., Microsoft Outlook) is modified to support at least some of the techniques described herein.

The techniques herein can also be provided by service providers (e.g., operating embodiments of platform 200 or configuring their infrastructure to cooperate with embodiments of platform 200). For example, Alice's ISP, web mail service 112, and corporate mail service 114 can each/all provide services in accordance with the techniques described herein. In particular, existing infrastructure provided by the service provider(s) can be adapted to provide at least some of the services described herein, or such services can be provided by one or more separate modules. For example, at least a portion of the functionality of platform 200 can be provided as a gateway (e.g., such that all of the mail of an enterprise is filtered by such a gateway as it arrives/is downloaded). As another example, the functionality of platform 200 can be provided at least partially by a milter (e.g., such that some portion of message processing is performed for free on behalf of an ISP, and any usage above that portion is charged to the ISP based on a contractual agreement). As yet another example, such services can be provided by proxies. The proxies can be controlled by the service providers (e.g., on premises), and can also be provided by a third party as an external service to the service provider. Service providers may opt to provide the services described herein to all users, and can also provide the services on a per-user basis. As one example, Alice could choose to "opt-in" to having web mail service 112 provide her with protections, while Bob could choose to forgo having web mail service 112 provide him with protection. As another example, Alice's ISP might automatically enroll her in protection services (e.g., based on her age or other demographic information indicative of her being particularly vulnerable, or based on any prior history of Alice having been victimized in an email scam). Bob, having different characteristics, would not automatically be enrolled (but could nonetheless be offered the ability to opt-in).

In some embodiments, a proxy 116 performs scanning/filtering services on behalf of users as a third party subscription service. For example, Alice's daughter "Eve" can purchase a subscription on behalf of her mother, Alice, or Alice might purchase a subscription for herself. As another example, Bob can purchase a subscription for himself, or his employer might subsidize the subscription on his behalf. The proxy is configured with the user name(s) and password(s) or other credentials for the email accounts to be protected. The usernames/credentials can be collected in a variety of ways. As one example, the user (e.g., Alice) can be explicitly asked to provide them. As another example, the information can be automatically collected on her behalf. The proxy can then access the account(s) periodically, or screen and filter traffic as it is being sent to and from the subscribed user.

In situations such as where services are provided by a third party (e.g., protections for Alice's account with web mail service 112 are provided by third party proxy 116), a filter can be used in order to avoid polling the email service provider (e.g., service 112) too often, which could be considered abusive/disruptive to the operation of service 112. One way to provide such filter services is by changing the DNS lookup tables associated with the client device, and thereby causing all traffic to be filtered by the proxy as it is being downloaded from web mail service 112 to the client device. Another approach is to augment the access functionality on the client device so that proxy 116 is notified when the client device attempts to access the account. As it is being notified, it performs the filtering activity. In yet other embodiments, proxy 116 provides a middleware component to device 102, where the middleware component catches calls made by the mail reader program (or browser) residing on the client device and then initiates a call to the web mail service 112. In yet other embodiments, the proxy mimics a client device that is constantly logged in and is polling for updates at a frequent but reasonable rate, such as once every minute.

In various embodiments, combinations of the components described above are used. For example, Alice can be protected both by a plugin or executable installed on client device 102, and one or more external protection services (e.g., offered by her ISP, by proxy 116, or by web mail service 112). In this scenario, Alice will be protected both when she uses her client computer 102 to read her mail, and also when she checks her mail in other places, such as at a library terminal or hotel kiosk. Finally, while the techniques described herein are generally described in conjunction with evaluating email communications, other forms of communications can also be monitored/filtered as applicable. For example, instant messaging clients can monitored (whether at the client, via a proxy, or at a server), and messages being sent to/from the protected user on such services treated in a similar way as is described for the emails, as applicable. SMS/MMS messages are another example of communications that can be screened/managed using the techniques described herein. Other communication technologies can also be monitored and filtered, as applicable. For example, automated voice recognition techniques could be used in conjunction with the screening of voicemail messages (e.g., in conjunction with a service such as Google Voice) or calls, and escalation involving human review could be performed (e.g., with the consent of the callee).

—Communication Classification Platform—

Figure 2:
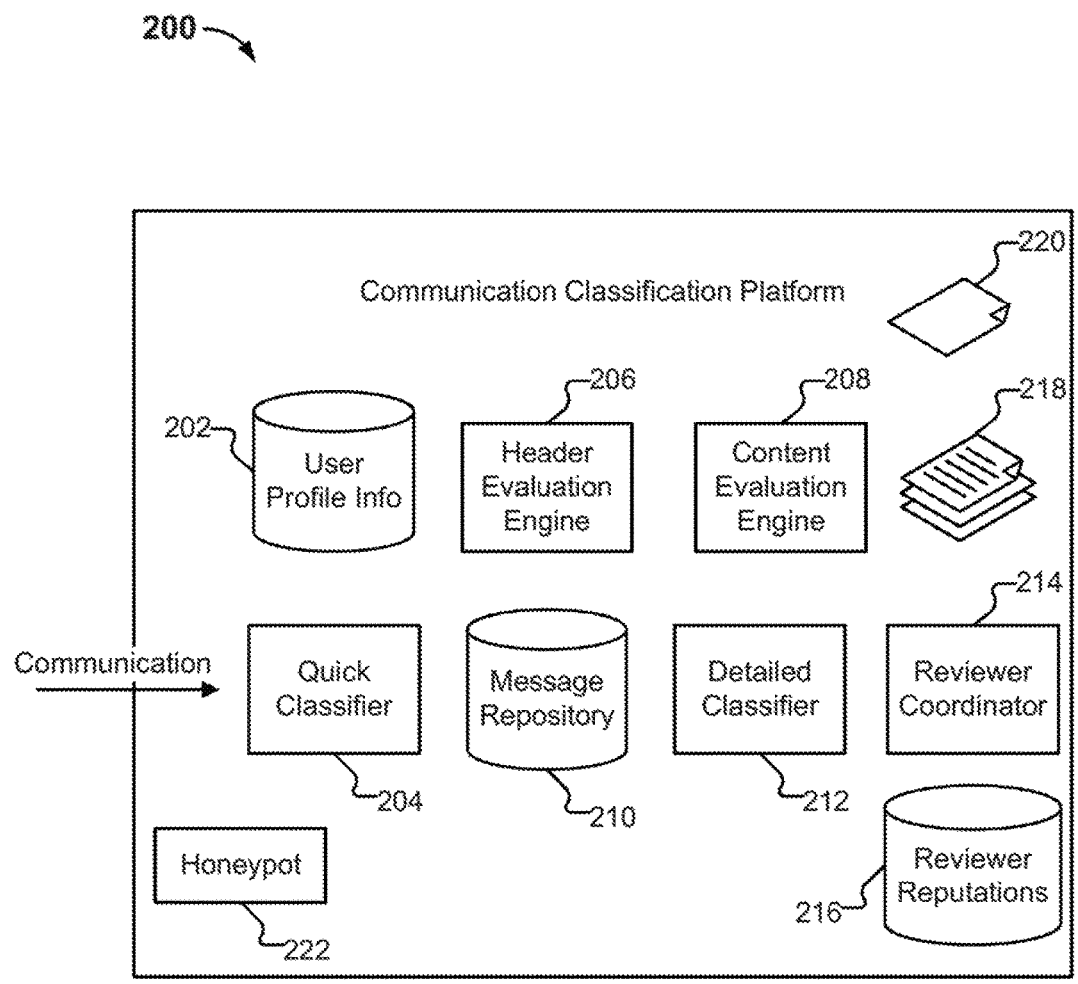
FIG. 2 depicts an embodiment of a communication classification platform.

FIG. 2 depicts an embodiment of a communication classification platform. As shown in FIG. 2, platform 200 can comprise a single device, such as standard commercially available server hardware (e.g., with a multi-core processor, 4+ Gigabytes of RAM, and one or more Gigabit network interface adapters) and run a typical server-class operating system (e.g., Linux). Platform 200 can also be implemented using a scalable, elastic architecture and may comprise several distributed components, including components provided by one or more third parties. As explained above, platform 200 (or portions thereof) can be incorporated into a variety of different components depicted in the environment of FIG. 1. As one example, all or portions of platform 200 may be provided by web mail service 112. As another example, portions of platform 200 may be located on client (or other) devices, such as client device 102 and portions not located on the client device may be omitted, or provided by a third party, as applicable.

In some embodiments, platform 200 includes a database 202 of user profile information. As one example, where proxy 116 implements platform 200, database 202 could include, for each user of the proxy, the user's username/password information for sites that are proxied. Database 202 can also include information such as the user's credit card information (where the proxy is run as a paid service), contact information, and any user-specific customizations. Examples of such customizations include user-specific whitelists (and any contextual information used to construct those lists, such as temporal information associated with message exhange), scoring thresholds, etc., described in more detail below. As another example, where client device 102 implements platform 200, database 202 can be implemented as one or more configuration files specific to the user(s) of the device. Further, in some embodiments communications for all users are handled the same way, and database 202 (and/or user-specific profile information) is omitted, or reduced in scope, as applicable.

In some embodiments, when platform 200 receives a communication for processing, the communication is provided to quick classifier 204. Header evaluation engine 206 evaluates any headers associated with the communication. Examples information evaluated by engine 206 include: the sender/originator of the communication, the apparent location and IP address of the sender, and the type of domain used by the sender. The header evaluation engine can also evaluate circumstances associated with the communication transmission, such as the time of day it was received, and whether it appears to be a first contact with the user, or a subsequence communication. Content evaluation engine 208 evaluates the content of the communication. As will be described in more detail below, examples of content analysis include analysis based on a "collection of terms" 218 (e.g., a set of terms which, when occurring in a single communication are indicative of a particular scam story), and/or analysis based on "indicating terms" 220 (e.g., individual terms whose presence in a communication are highly indicative of scams). In some embodiments, platform 200 includes a honeypot engine 222 configured to collect fraudulent messages, along with their sender information, by generating traffic from one or more honeypot accounts; and collecting and evaluating traffic to such accounts. The indications of fraudulent activity derived from these actions can be used to help improve the filtering of messages received by real users.

In some embodiments, a tertiary classification (e.g., "bad," "good," and "undetermined") is made based on the performed evaluations (and, if applicable, taking into account any user-specific information). Where the result of the evaluation is "undetermined," the communication is optionally stored in repository 210 and provided to detailed classifier 212 for enhanced processing. In some embodiments, quick classifier 204 is provided by one entity (e.g., is located on device 102 or provided by an entity such as corporate mail service 114), and detailed classifier 212 is provided by another entity (e.g., is provided by a third party operator of platform 200, proxy 116, an ISP, or other applicable entity).

In various embodiments, quick classifier 204 and detailed classifier 212 employ different classification techniques. For example, quick classifier 204 may rely solely on white/blacklists (e.g., requiring less than one second to process a message), while detailed classifier 212 may employ machine learning or other more sophisticated/resource-intensive automated review techniques (e.g., requiring two minutes of processing per message). As will be described in more detail below, in some embodiments, detailed classifier 212 makes use of one or more human reviewers (120-124) instead of or in addition to performing automated analysis. For example, review coordination engine 214 can make available a copy of the communication to one or more human reviewers, who determine whether the communication should be classified as "bad" or "good." The reviewer feedback is provided back to detailed classifier 212, which uses the information to determine a final disposition/classification of the message. In some embodiments, when a message is sent out for human review, the conclusion of the human review decides the disposition of the message. In other embodiments, the human classification is treated as one factor of a score (e.g., worth 50 points), discussed in more detail below.

In some embodiments, the reviewers are assigned reputation information (e.g., by coordinator 214), which is stored in reputation database 216. The reviewers can also be compensated for their reviewing efforts, with associated book-keeping being performed by coordinator 214 or another appropriate module. As will be described in more detail below, the reviewers may comprise a variety of individuals, including paid employs of the operator of platform 200, other users of platform 200 (e.g., who perform reviews in exchange for a discount/rebate on services), a family member (e.g. Eva on behalf of Alice), and/or members of a third party outsourcing platform, such as Amazon Mechanical Turk. In some cases, such as where the human analysis is performed by a trusted entity within an organization (e.g., a member of the IT department reviewing an email sent to Bob at his work address), the full text of the message may be provided to the reviewer. In other embodiments, the message is partially redacted prior to being provided to a reviewer, also as described in more detail below.

—Tertiary Classification of Communications—

Figure 3:
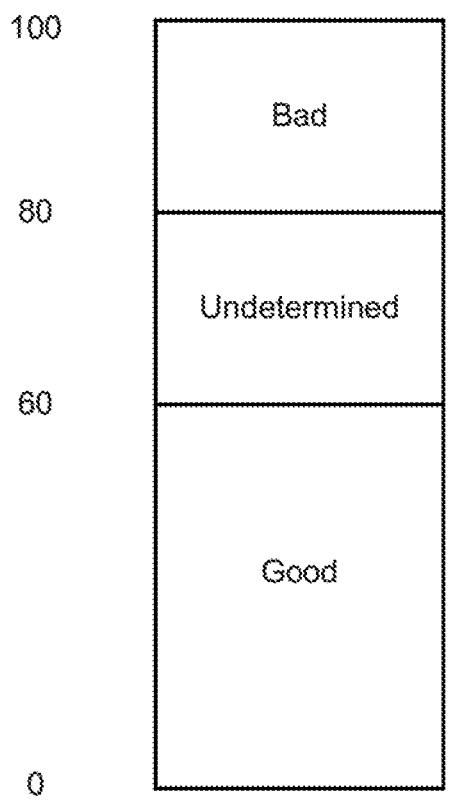
FIG. 3 depicts an example of a set of score thresholds used in an embodiment of a tertiary communication classification system.

FIG. 3 depicts an example of a set of score thresholds used in an embodiment of a tertiary communication classification system. In some embodiments the set of thresholds is used for all users of a classification system (e.g., where corporate mail service 114 uses the same settings for all users). In other embodiments, the set of thresholds is adjustable on a per-user or per-user-group basis, either at the request of the user(s) or based on factors such as an assessment of the vulnerability of the user/user-group to various communication-based scams/threats.

In the example shown, a communication that receives a score (e.g., from quick classifier 204) of less than 60 is determined to be "good." A communication that receives a score of greater than 80 is determined to be "bad." A communication that receives a score between those values is determined to be "undetermined" and flagged for further analysis (e.g., by detailed classifier 212). In various embodiments, the thresholds are set such that there are no false positives: all emails for which there is a risk for false positives (i.e., a "bad" email being classified as a "good" email) are instead classified as "undetermined" and subjected to additional processing. The determination of how to set the thresholds is a risk assessment wherein the risks of false positives are weighted against the risk of false negatives.

Communications that are determined to be "good" (also referred to herein as "green") are delivered to their intended recipient. For example, an email intended for Alice that receives a score of "10" is ultimately delivered to Alice's inbox on web mail service 112. The display of good messages may also be modified, e.g., so that "good" messages are colored green or include green elements when rendered.

Communications that are determined to be "bad" (also referred to herein as "red") are not delivered, in some embodiments. One reason to not deliver the message at all, if determined to be bad, is that an unsophisticated user may unwittingly believe the message has been misclassified and fall for the scam represented by the message. Other handling of "bad" communications can also be configured. For example, "bad" messages can be delivered to a special folder, or are marked as being highly suspicious (e.g., colored bright red when displayed). In some embodiments, "bad" messages are delivered to a separate account associated with the user. As one example, a "bad" message sent by Charlie to alice@examplewebmail.com (Alice's email address on service 112) could be redirected to alice.screened@examplewebmail.com. Alice could authorize Eve to access the secondary account (but not her primary account) to review and permanently delete any "bad" messages, and to make sure no false negatives (i.e., "good" communications erroneously classified as "bad") occur.

As mentioned above, messages that are neither "good" nor "bad" are flagged as "undetermined" (also referred to as "yellow") and subjected to additional processing prior to final disposition. As needed, the communication is held (e.g., in repository 210) until a determination is made as to whether the communication is "good" or "bad." Additional detail regarding the additional processing of "undetermined" messages is provided below.

Figure 4:
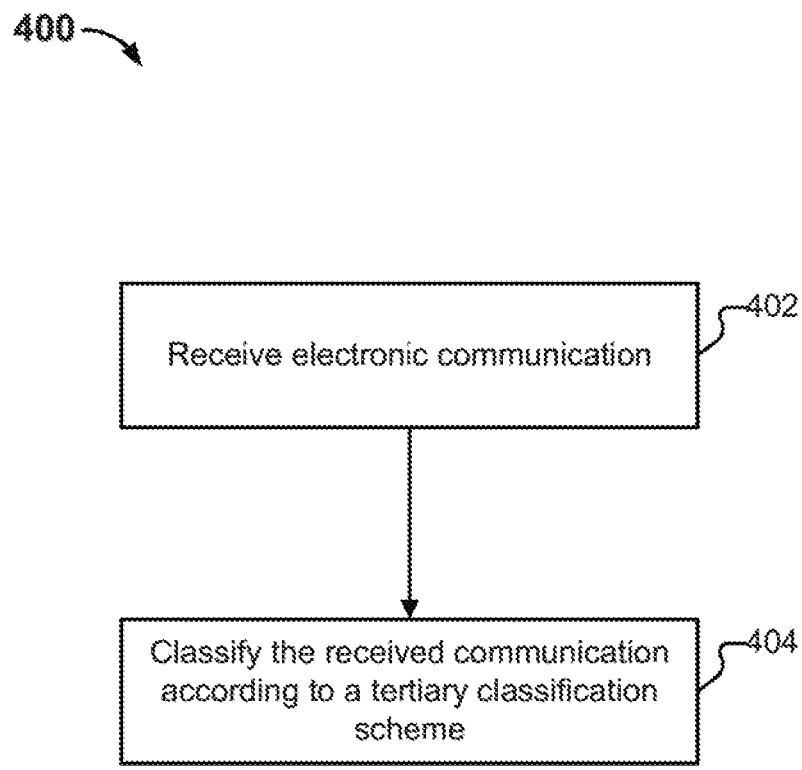
FIG. 4 illustrates an embodiment of a process for classifying communications.

FIG. 4 illustrates an embodiment of a process for classifying communications. In some embodiments process 400 is performed by platform 200. The process begins at 402 when an electronic communication is received. As one example, a communication is received at 402 when web mail service 112 (which includes at least some components of platform 200) receives a message from Charlie addressed to Alice. As another example, where at least some of the functionality performed by platform 200 is incorporated into a mail client installed on Bob's laptop 106, the mail client could receive a communication at 402 when Bob's mail client contacts corporate mail service 114 to retrieve new mail (e.g., via POP).

At 404, the communication is classified according to a tertiary classification scheme. As explained above, in some embodiments, the communication might be definitively classified as "good" or "bad" by a quick classifier 204. If the communication is instead determined to be "undetermined" by the quick classifier, it is provided to detailed classifier 212 for heightened review. In some embodiments, the quick classifier and the detailed classifier are collocated on a single platform (e.g., as depicted in FIG. 2). In other embodiments, the classifiers reside on separate devices and/or may be configured by or under the control of distinct entities. As one example, a quick classifier could be included in a mail client resident on phone 104. As the phone has limited computing and other resources, and messages received on the phone could be handled by a remote detailed classifier (e.g., provided by proxy 116). Further, in some embodiments multiple detailed classifiers are employed, and/or multiple rounds of enhanced scrutiny are applied to messages that are not clearly "good" or "bad." As one example, where detailed classifier cannot definitively determine whether a message is "good" or "bad," the message can be provided to one or more amateur human reviewers (e.g., members of the public who have agreed to help review messages). If the amateur reviewers are similarly unable to determine/agree that a given message is "good" or "bad," the message can be provided to professional reviewers (e.g., employees of the owner of platform 200 or paid contractors). Protected users/subscribers can also potentially act as reviewers (whether for themselves or others). For example, if a sufficient number of protected users report a received message as "spam," the message would be considered "bad," and/or would cause the message to be provided to be given to amateur or professional reviewers to classify.

The classification performed at 404 can be based on a numerical score (e.g., using numerical thresholds such as are depicted in FIG. 3). The classification performed at 404 can also be based on a set of rules. Examples of both approaches to classification are given below, and will draw from the following list of example considerations:

1. "collection of terms"—The co-occurrence of certain terms from separate domains in a message can be indicative of a fraudulent message that corresponds to a particular scam scenario (described in more detail below). As one example, a message that contains the term "MCTN" (a term specific to Western Union) and also the term "Google Wallet" is indicative of fraud. Scammers frequently offer to send fake Google Wallet payments and request money back using Western Union. The two terms are extraordinarily unlikely to co-occur in a legitimate email discussion. However, a term such as "Google Wallet," by itself, could be prevalent in legitimate emails; a blanket blacklisting of the term is likely to result in far too many false positives (flagging legitimate messages as scam messages) to be tolerated by users being protected. The presence of a collection of terms in a message almost certainly indicates the message is fraudulent. Another example collection of terms is: "Internet Lottery," "your email has won," "congratulations," and "million dollars." The last term, "million dollars" is also considered present in a message if any so-called equivalent terms are present; such terms may consist of a list "millions dollars", "million pounds", and "several millions."

2. "indicating terms"—Terms that are statistically common in scam communications and uncommon in legitimate communications. "Internet" and "your name" are not indicating terms, as they are very prevalent in legitimate communications. "Abacha," however, is virtually absent from legitimate communications but prevalent in scam communications. Additional examples of "indicating terms" include "modalities," "no risk," "($*,000,000)" where * denotes an arbitrary value. The absence of any indicating terms in a message almost certainly indicates that the message is benign.

3. "friendly email"—A user-specific whitelist of email addresses. In some embodiments, the user or an administrator provides the whitelist. In other embodiments, the whitelist is constructed based on an observation (e.g., by platform 200) of communications. As one example, once a protected user has exchanged more than a threshold number of emails with someone at a given email address, over a threshold period of time (e.g., ten emails over the course of two weeks), then the address could be designated as a friendly email.

4. "friendly location"—A user-specific geolocation of friendly emails (or other identifier of a communication's origin). In some embodiments, the geolocations associated with email addresses that are considered to be friendly (e.g., per above) are designated as "friendly" after threshold requirements are met. As one example, if Alice has a friend in Paris, France, with whom she routinely communicates, that friend would eventually be added to the "friendly email list." The geolocation of "Paris, France" could then be added as a friendly location (e.g., after Alice has exchanged more than twenty messages with her Parisian friend, over a period of at least one month). In some embodiments, a freshness test is employed, so that a location only remains friendly so long as the threshold amount of communication continues to be exchanged (or some other "maintenance" level of communication). An example of a way the likely approximate location of the sender can be determined is by review of the routing path, which is always available to a receiving ISP, and commonly available to the final recipient.

The geolocations designated as "friendly" can take a variety of forms, ranging from specific IP blocks/subnets (e.g., indicative of the particular French ISP used by Alice's friend), to political boundaries such as neighborhoods/ZIP codes/cities/counties/states/countries, or arbitrary designations such as "within a 20 mile radius" of a given location. The classification can also be performed by determining if the IP is not in a given range, e.g., "any not originating in Denmark" is not friendly.

Alice might visit her friend (and make new friends) or otherwise legitimately begin communicating with others in Paris. Such communications are much less likely to be fraudulent/take advantage of Alice than communications originating from a geolocation with which she's not previously had contact (e.g., Spain or Ghana). A variety of rules can be used to govern whether/when a friendly location is added. For example, if Alice's Parisian friend visits China for a week, and sends a handful of emails to Alice, platform 200 will not automatically add the country of China to Alice's friendly location list. One way to ensure China is not added is to require a threshold number of additional "friendly email" addresses in a given region before adding a region, and/or connecting the number of friendly emails to the footprint of the associated geolocation (e.g., requiring Alice to receive mail on a regular basis from three people in a given state or country before adding the entire state/country).

In some embodiments, friendly languages are determined, and may, for example, correspond to the languages spoken in the friendly locations. Thus, if a language used in the message is either on a particular list of languages, or is not on a list of on a list of particular languages, then this can be used as a factor to cause the email to be identified as good, suspect, or bad. Rules can also be combined, describing scenarios such as: "All email from outside Scandinavia is considered suspect, except email from Britain if the language is Swedish and there are no indicating terms in the email." A variety of approaches can be used to assess messages according to such rules. For example, services such as Google translate can be used; comparisons of message contents to word lists of different languages can be performed; and/or the encoding of the message and the associated language character table can be identified. Most computers use UTF (8,16) to display contents. In the case of HTML pages, the page typically has a metatag that indicates the encoding of the page, and if the characters are from a certain part of the coding table that shows the language of the page.

While it may seem unnecessarily restrictive to block traffic from entire subnets, countries or even continents, or likewise to block traffic in certain languages, there are many users to whom the Internet poses greater threats than benefits unless drastic limitations of freedom are made. Thus, to such users, or to concerned family members, it may be desirable/reasonable to block traffic from all countries where the protected user does not have any friends, family or business partners, or conversely, to only admit traffic from whitelisted locations. The importance of a given factor, including friendly location, can be determined by weights associated with the rules; also, for some users, only a subset of the rules need be active or configured.

5. "suspect location"—A listing of VPN proxy addresses, Tor exit nodes, zombie/bot nodes, and other known-bad sending locations that is not user-specific. As one example, if a particular ISP in Ghana is known for originating a great deal of scam messages, that ISP could be designated as a "suspect location." And, paths can also be used, e.g., any web email originating in Ghana, or originating in Spain.

6. "undisclosed location"—A listing of webmail providers that is not user-specific, and a location that resolves to a VPN, known bot node, or similar problematic location.

7. "global friendly senders"—A listing of well-known, benign electronic commerce and other service providers that is not user-specific.

8. "spoof"—Messages sent to "undisclosed recipients" and/or other indicators of sender spoofing. Additional examples include: (1) comparing the originating IP address with the domain; (2) identifying suspect IP addresses on the path of the message; (3) identifying an unusual number of hops; (4) identifying previously identified bad IP addresses in long headers; (5) email contents being misaligned with the domain appearing to have originated the message; (6) email contents being misaligned with the IP addresses on the path of the message; and/or (7) the email has a sufficiently different reply-to address from the apparent sender address, or (8) the email has a sufficiently different reply-address from both the apparent sender address and the originating domain.

Example—Numerical Scoring

Each of the above eight example considerations is associated with a number of points. The following is one example of how points could be assigned:

| | |
|---|---|
| (collection of terms fires): | 65 points |
| (indicating terms fires): | 10 points |
| not (friendly email): | 25 points |
| not (friendly location): | 25 points |
| (suspect location): | 30 points |
| (undisclosed location): | 10 points |
| (global friendly sender): | −20 points (this value is negative, indicating that the presence of the condition being true is indicative of a "good" message) |
| (spoof): | 50 points |

For a given communication, the points are summed, and compared to thresholds. Below are two examples of thresholds, one set for Alice (e.g., by Eve) and one set for Bob (e.g., by his employer):

Alice:
<15 points—green
>50 points—red
otherwise yellow
Bob:
<25 points—green
>60 points—red
otherwise yellow Example—Rule-Based Various rules involving the eight example considerations can be defined and associated with tertiary classifications. The following are two examples of how rules can be specified—again, with Alice's rules being more strict against potential scam, and Bob's being more lax:

Alice:
RED if:
  (Collection of terms fires), or
  Spoof, or
  no color determined and (not friendly location) and (not friendly email) and (not global friendly senders) and (indicating terms), or
  no color determined and ((undisclosed location) or (suspect location)) and (indicating terms fires)
GREEN if:
  no color determined and (friendly email) or (global friendly senders), or
  no color determined and (friendly location) and not (indicating terms fires)
YELLOW otherwise.
Bob:
RED if:
(Collection of terms fires), or
Spoof
GREEN if:
no color determined and (friendly email) or (global friendly senders), or
no color determined and (friendly location) and not (indicating terms fires), or
no color determined and (friendly location), or
no color determined and (friendly location) and not (indicating terms fires)
YELLOW if:
no color determined and (not friendly location) and (not friendly email) and (not global friendly senders) and (indicating terms), or
no color determined and ((undisclosed location) or (suspect location)) and (indicating terms fires), or
[otherwise doesn't match any rules].

The rules for what is red, green, and yellow are configurable on a per-case basis and an administrator can select and configure these rules. Conflict between rules can be managed by a pessimistic approach (if any indicator says it is red, then it is red); using a threshold (if at least X indicators say it is red, then it is red); or with exceptions (it is not red if it is on the whitelist, otherwise if any indicator says it is bad then it is red.) These different approaches carry different risks of false positives, where the risk for false positives would be higher for the pessimistic approach than it would be for the other described approaches. Yet other more flexible policies for determining how to manage conflicts can also be used; such as by having each rule associate a score to each message and each rule being associated with a weight, allowing an aggregated weight to be computed and compared to a threshold value, which can be a scalar or a vector element.

Figure 5:
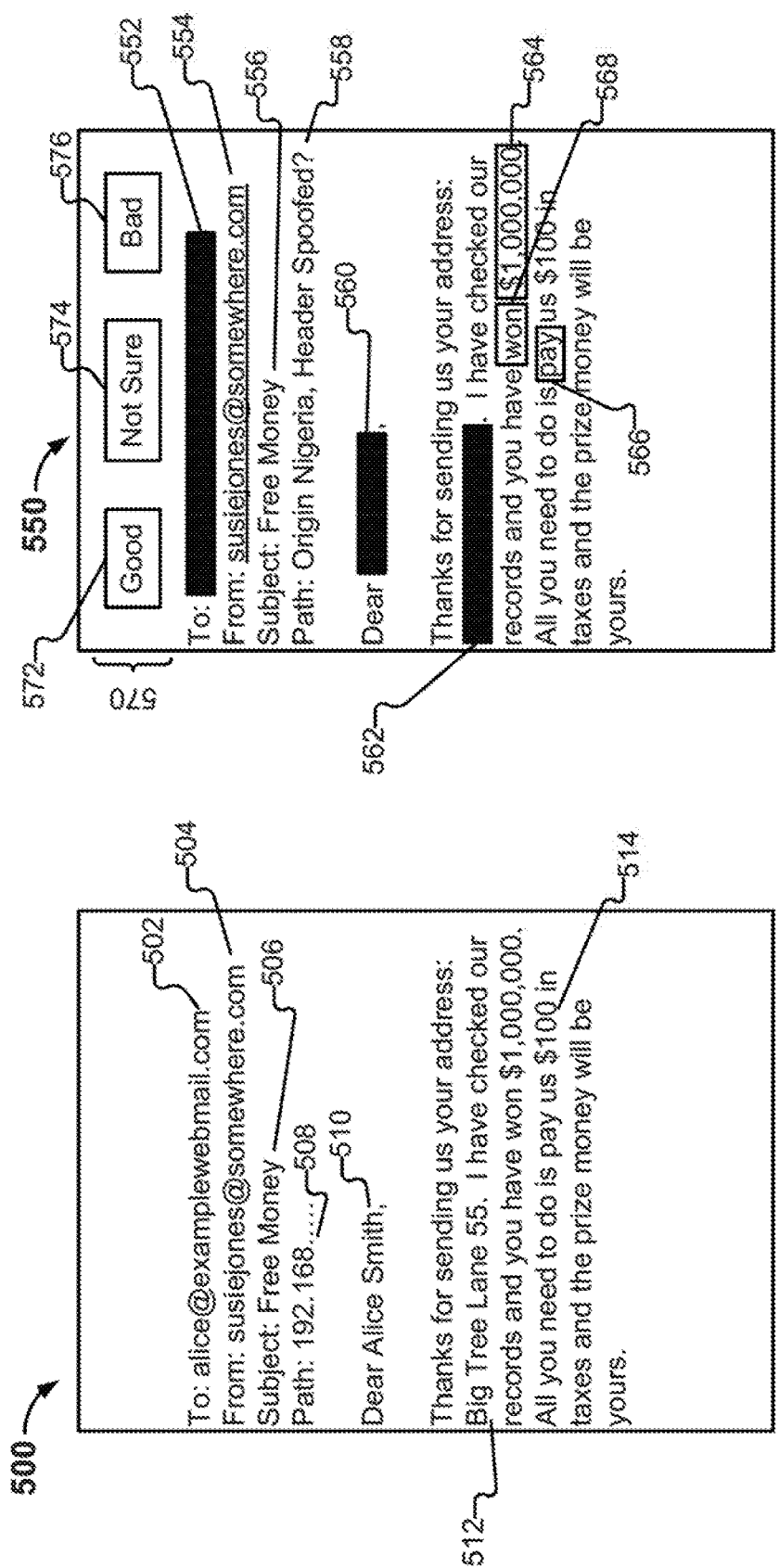
FIG. 5A illustrates an example of an electronic communication.
FIG. 5B illustrates an example of an interface for classifying an electronic communication.

FIG. 5A illustrates an example of an electronic communication. In particular, message 500 is an example of a fraudulent email message that Charlie has attempted to send to Alice. In this example, Charlie has previously contacted Alice (e.g., letting her know she has won a prize and asking for her address to determine which prize she has won), and Alice has responded (e.g., with her address). In practice, Charlie's original message, and/or the concatenation of the exchanges between Charlie and Alice would have been classified by quick classifier 204 as "bad" (e.g., based on the "collection of terms" technique described below). However, for purposes of this example, suppose that quick classifier 204 has classified message 500 as "undetermined." The message is provided to detailed classifier 212 for further analysis. As mentioned above, in some embodiments, detailed classifier 212 is configured to leverage the assistance of human reviewers in determining whether an undetermined message should be definitively classified as good or bad. Detailed classifier 212 provides the message to review coordinator 214 which redacts the message as applicable, and provides the redacted message to one or more human reviewers. In particular, personally identifiable information, such as contact information associated with the protected user (i.e., potential victim recipient) is redacted. In some embodiments, other processing is also performed prior to providing the message to a reviewer for review. For example, terms commonly used by scammers can be highlighted, and path information made easier to understand, as described in more detail below. Such processing can be performed based on parsing of the text (or optical character recognition (OCR) of images, followed by parsing of the resulting text); comparisons to known personally identifiable information (PII) terms/formats (e.g., common first names; recognition of phone numbers; recognition of addresses); and comparison to known terms commonly used by fraudsters, but not as commonly used in non-fraudulent messages (described in more detail below). In some scams, messages are included as attachments, and/or links included in the email (or, e.g., an SMS) direct victims to a website that includes an image of text. Processing can further include examining attachments, and detecting and following such links, and OCR'ing/parsing the obtained content as applicable.

FIG. 5B illustrates an example of an interface for classifying an electronic communication. The example shown is an embodiment of an interface shown to a reviewer, such as reviewer 120. The interface can be provided in a variety of ways. As one example, platform 200 may provide a web interface/portal which reviewers can access, log into, and then select an option to "start reviewing." As another example, e.g., where Eve is reviewing Alice's messages, Eve may receive an email or other alert, letting her know that new mail which requires review has arrived for Alice, and asking Eve to access an interface provided by platform 200. In yet other embodiments, the interface is provided as a tablet or other mobile device app, allowing reviewers to review messages in a custom interface.

In interface 550, Alice's email address 502 has been redacted (552). The sender's email address 504 is underlined (554) to indicate that the sender is involved in other messages, which the reviewer can access by clicking on region 554. Subject line 506 is shown in the redacted version of the message (556). The path of the message 508 is textually and/or visually clarified/simplified. For example, the IP address information is replaced with a geographic location and an indication that it may be spoofed (558). Other techniques for simplifying location information can also be provided, such as by showing country information on a map when the reviewer hovers a mouse pointer over region 558.

Alice's name 510 is identified as a personal name and removed (560), as is component 512 (562), which is identified as an address. In some embodiments, instead of blacking out the personal information, the information is placed with an indicator of what has been removed, e.g. "NAME" in region 560 and "ADDRESS" in region 562. Where reviewer coordinator 214 is unable to definitively determine whether a portion of the message should be redacted, the label over the redacted portion can indicate as such, e.g., "PROBABLY AN ADDRESS." Elements of the remaining text commonly associated with scams are highlighted for the reviewer's convenience (564-568).

In region 570, the reviewer is asked to make a determination of how the message should be classified, by clicking on one of buttons 572, 574, or 576. The result of a button press is received by review coordinator 214, which collects the feedback from any additional reviewers who have been asked to review the message. In some embodiments, a feedback field or other mechanism is included in the interface so that the reviewer can provide feedback on why the message was classified. As one example, the reviewer could explain what reasons led the reviewer to be "not sure" about the message, to help a subsequent reviewer come to a definitive decision.

In some embodiments, the results of other filter rules are indicated in the image shown to the reviewer, to assist the reviewer in assessing the message. For example, where the sender location is friendly, that information could be provided at the top of the interface, or inline (e.g., next to region 554). As another example, information such as "UK proxy" or "unknown ISP" can be included in region 558.

In some embodiments, a single definitive (i.e., "good" or "bad" designation, but not "not sure" designation) classification by a reviewer is sufficient to classify the message. This may be the case, for example, where a relative of the protected user is performing the review (i.e., Eve reviewing on behalf of Alice), or a designated employee is performing the review (i.e., a member of Bob's company's IT department reviewing on behalf of Bob). In this scenario, button 574 may be omitted, if applicable. The number of reviewers assigned to review a message can also be based on a service level associated with the protection. For example, platform 200 may offer free protection services (where only one human reviewer will resolve undetermined messages) and also offer premium services (where multiple reviewers will vote, and/or where the experience of the reviewers varies based on subscription level).

Where multiple reviewers are asked to review a message (e.g., in parallel, as a group), if a sufficient number of reviewers indicate that a given message is fraudulent by clicking on the "bad" button 576, then the message is classified as "bad." If a sufficiently large number of reviewers select the "good" button 572, then message is considered good. If a sufficient number reviewers select option "not sure" 574, in some embodiments, the classification task is elevated to more experienced reviewers, e.g., as assessed by the number of cases they have judged, their reputation, and/or the duration that they have provided feedback. A variety of approaches can be used to determine whether the "sufficient" number is reached. As one example, a rule can be specified that the selected group of reviewers must agree unanimously. As another example, a rule can be specified that a threshold percentage of the group must agree. As yet another example, the "votes" of the reviewers can be weighted by their respective reputation scores (e.g., stored in database 216). Additional information regarding reviewer reputations is provided below.

Reputations can be assigned to reviewers in a variety of ways. As one example, reviewers can be asked to review training materials and then, upon completion, evaluate a set of sample messages. A reviewer's reviewing accuracy with respect to the sample set can be used to assign a reputation to the reviewer. In some embodiments, the reputation is binary (e.g., "trusted" or "not trusted") or tertiary (e.g., "good reviewer," "average reviewer," "novice reviewer). The reputation can also be a score (e.g., 16/20) or percentile (e.g., $75^{th}$ percentile). In some embodiments, novice reviewers are assigned a starting reputation of 10/100. As they classify messages, their score is increased or decreased based on whether other, more experienced reviewers agree with their assessment. If a novice reviewer's score reaches a low threshold (e.g., 5/100), the reviewer is warned to do a better job, and/or prevented from reviewing any more messages, due to poor performance (e.g., once the reviewer's score dips below 3/100). Where compensation is awarded (whether in the form of monetary payment, or additional reputation/other points), the compensation for a "correct" vote may be evenly distributed across all reviewers voting correctly, and may also be distributed according to a formula, e.g., that takes into account the reviewer's respective reputation scores, history, etc.

Figure 6:
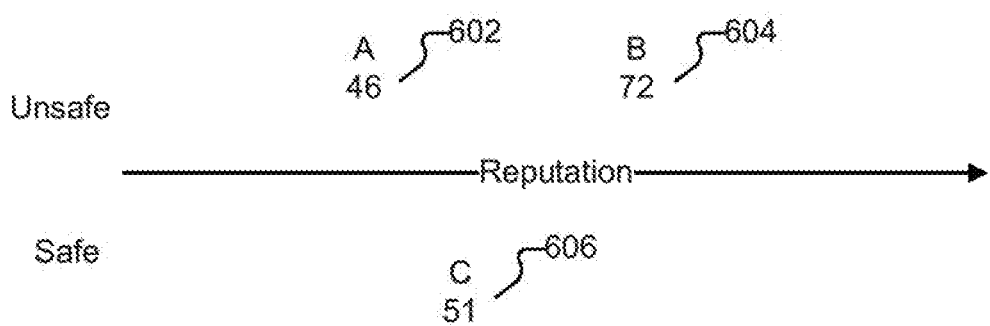
FIG. 6 depicts an example of a review performed by multiple reviewers.

FIG. 6 depicts an example of a review performed by multiple reviewers. In the example shown, reviewer A (602) has a reputation of 46. Reviewer B (604) has a reputation of 72. Reviewer C (606) has a reputation of 51. Reviewers A and B have both flagged the message being reviewed as "unsafe" (i.e., bad). Reviewer C has flagged the message a "safe" (i.e., good). One way to determine an assessment of the message is to sum each of the votes. In the example shown in FIG. 6, such a score could be computed as 46+72−51 (total 67). Another way to determine the assessment is to assign one vote to each reviewer, and then weight the respective votes based on reputation buckets. As one example, a reputation at or above 65 could be accorded a full vote, a reputation between 50 and 65 could be accorded 0.75 votes, and a reputation 50 or below could be accorded 0 votes. Votes determined to be correct are rewarded with heightened reputations, and votes determined to be incorrect are penalized with lowered reputations. In some embodiments, a function is used to determine how much reward or penalty is to be applied. As one example, reputations may be recomputed daily or weekly, and the total number of messages reviewed by a reviewer taken into account considered when adjusting the reputation. As one example, a reviewer who reviews at least 20 messages in a week, and gets no more than ten percent wrong, could be assigned two points of reputation for that week. A reviewer who gets more than ten percent wrong (irrespective of total number reviewed) could be penalized by four points.

In various embodiments, reviewers are made aware of the fact that there are at least some additional reviewers reviewing the message. Information about the other reviewers, such as their number and respective reputations, can selectively be displayed or not displayed (e.g., based on configuration settings made by an administrator). In some embodiments, reviewers are unaware (or are otherwise not informed) about whether or not multiple reviewers are examining the message they are examining.

—Collection of Terms—

Overview

As mentioned above, in various embodiments, platform 200 evaluates communications based on the presence of a "collection of terms." As explained above, the presence of a collection of terms in a message almost certainly indicates the message is fraudulent, and the absence of any indicating terms in a message almost certainly indicates that the message is benign. Accordingly, in some embodiments, evaluation of a communication is performed using a collection of terms, and a binary classification (i.e., scam or not scam), score, or other non-tertiary classification scheme is used. In other embodiments, the presence of a collection of terms in a communication (and/or absence of indicating terms) is one factor in tertiary classification.

In some embodiments, quick classifier 204 and detailed classifier 212 cooperate to perform tertiary classification of messages. In other embodiments, at least some portion of the time, the classifiers use a "collection of terms" to classify communications (e.g., as fraudulent or not) and do not perform tertiary classification. In various embodiments, a single classifier is included in platform 200 (e.g., quick classifier 204 is omitted, and detailed classifier performs any functionality otherwise provided by quick classifier 204).

FIG. 7A depicts an example of a collection of terms. In particular, FIG. 7A provides an outline of a particular form of scam that is perpetrated by 419 scammers—trying to convince the victim that he or she is entitled to a large sum of money as an inheritance, and that the money will be provided as soon as the victim pays a small fee. Although the main points of the message will be common across all such scam messages conforming to the "story" the scammer is trying to trick the victim into believing, the actual wording of the scam message may vary from message to message (e.g., to thwart detection, because the message has a particular author with a distinctive writing style, or because the message was written in a first language and translated to a second). Further, subtle variations may occur due to writing problems such as misspellings.

Each row in the collection of terms depicted in FIG. 7A corresponds to one aspect of the inheritance scam story. Where multiple terms appear on a given row, the terms are collectively referred to as an equivalence class—terms that fulfill the same purpose if used in the story. For example, the particular scam represented by FIG. 7A typically begins with an introduction of either "My name is" (702) or "I am" (704). The scam will next invoke a long-lost relative (or their representative). Equivalence class terms for this aspect of the story are shown in region 706. Next, the scam will describe the large amount of money (in one of three formats shown in region 708) that can be collected by the victim in one of three formats. The scam then indicates that all that is required for the victim to receive the money (e.g., "transfer" 710) is for the victim to provide banking details (see region 712 for terms). The victim is encouraged to provide the banking details right away (see region 714 for terms), e.g., to minimize the likelihood the victim will tell a friend or relative about the email and be discouraged from providing payment information.

FIG. 7B shows an example of a fraudulent message that would be detected based on analysis by content evaluation engine 208 of the collection of terms depicted in FIG. 7A. The terms in message 750 that are present in the collection of terms of FIG. 7A are underlined. In some embodiments, which term in an equivalence class is used in a message (e.g., "My name is" vs. "I am") is not taken into account when evaluating the message. In other embodiments, different terms receive different scores. As one example, "huge sum" might be scored higher (i.e., indicating the message is more likely to be fraudulent) than ",000."

Figure 8:
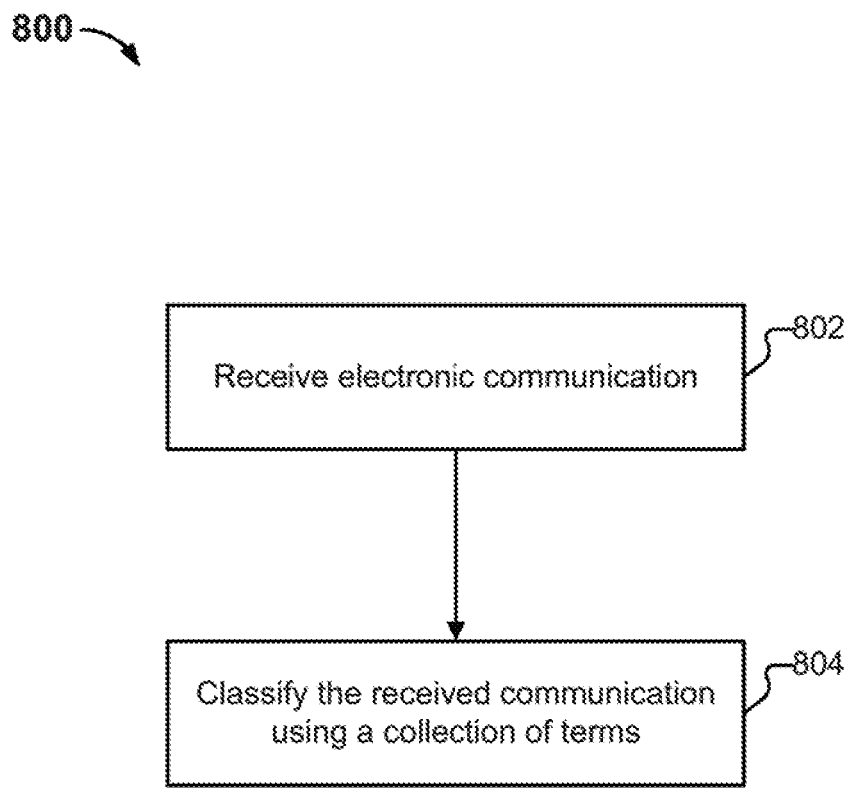
FIG. 8 illustrates an embodiment of a process for classifying communications.

FIG. 8 illustrates an example of a process for classifying communications. In some embodiments, process 800 is performed by platform 200. The process begins at 802 when an electronic communication is received. As one example, a communication is received at 802 when web mail service 112 (which includes at least some components of platform 200) receives a message from Charlie addressed to Alice. As another example, where at least some of the functionality performed by platform 200 is incorporated into a mail client installed on Bob's laptop 106, the mail client could receive a communication at 802 when Bob's mail client contacts corporate mail service 114 to retrieve new mail (e.g., via IMAP).

At 804, the communication is classified using a collection of terms. As explained above, in some embodiments the communication might be definitively classified as "good" or "bad" based on the analysis of the message against the set of collections of terms 218. In other embodiments, the collections of terms analysis is one consideration among multiple considerations (e.g., the additional example considerations listed above). In various embodiments, the distance between at least some terms appearing in the message is taken into account when determining whether the message should be marked as fraudulent based on the presence in the message of a collection of terms. As one example, while presence of the terms, "Nigeria" and "senator" in the same short message may typically indicate that the message is fraudulent, the message is likely not fraudulent where the terms are separated by 5,000 characters.

The classification performed at 804 can be performed using a variety of techniques. For example, a collection of terms can be evaluated using a rule-based approach (e.g., testing for the presence of words, and/or applying a threshold number of words whose presence are needed for a match to be found); using a support vector machine, where the elements of the support vector corresponds to terms or words; and/or using general artificial intelligence methods, such as neural networks, wherein nodes correspond to terms or words, and wherein the values associated with connectors cause an output corresponding essentially to a rule-based method. In each of the aforementioned embodiments, a value associated with the severity of the collection of terms being identified can be generated and output, where multiple values are generated if multiple collections of terms have been identified.

Additional Information Regarding Collections of Terms

In some embodiments, each term (or its equivalent) must appear in the message in the order it appears in the collection. Thus, using the example of FIG. 7A, in some embodiments, if "transfer" appears before "huge sum" in a message being analyzed, the message will not be flagged as a scam, because the ordering in the collection of terms is reversed. In other embodiments, order of terms does not matter, e.g., so long as at least one term from each line of the collection shown in FIG. 7A is present in the message, the message will be classified as an inheritance scam.

In some embodiments, platform 200 maintains scores associated with each collection of terms. One such value indicates, for each type of scam, how successful the associated term collection is at matching fraudulent emails making use of that scam. Based on factors such as the concern for various types of scams, and based on computational limitations, a selection of which term collections are to be used can made, e.g., where processing is performed on a device with limited resources, such as phone 104.

A second value associated with each collection of terms indicates the risk for false positives associated with the term collection, in the context of a given user. Example ways to determine the value is by scanning the user's inbox; by letting the user identify his or her normal activities; and/or by running the system for some amount of time; and determining the value based on classification of uncertain cases by human reviewers who review messages and classify them. This second value can also be used to select collections of terms, e.g., to avoid term collections that lead to higher false positive rates than a particular user find acceptable.

Both values can be configured based on the preferences of the protected user, and on the service level of the user (e.g., where users with higher service levels are given higher computational effort). In some embodiments, a collection of terms is matched to a portion of an email address, and a determination is made as to whether the email is from a domain associated with the terms; if it is not, then the email is flagged. As one example, an email with terms suggesting that the email is the confirmation of a financial institution payment but which is not sent from the financial institution domain is flagged as scam. In another example, a determination is made as to whether the message is from a particular sender, and if it is not, then the message is flagged as scam. In yet another example, all words are normalized before the comparison is made. This includes performing a consistent capitalization, correcting likely spelling mistakes by replacing words with the most likely candidates from a list of related words, where this list is created to emphasize words commonly used by scammers.

The following is another example of detecting a fraudulent message using a collection of terms. Suppose there are a total of two terms included in the collection (corresponding to a fraud in which victims are asked to send money by Western Union in exchange for a bogus Amazon.com payment). In this example, no equivalence terms are included—just a total of two distinct terms—("Western Union","Amazon payment"). If a document contains both of these terms, whether separated by other words or not, then the document is considered to match. Suppose the message is, "Here is an Amazon payment for $100. Please send me $50 with Western Union." Such a message would match the collection of terms, as would "Please send your Western Union payment after you receive the Amazon payment." However, a message of, "Here is an Amazon payment for the Western Digital hard drive I want to purchase. Please send it to my home in Union, N.J.," would not match since "Western" and "Union" are separated. A message of, "Here is an AMAZON payment for $100, please send the money with western union" would match, where normalization is applied to remove capitalization. In an embodiment where spelling errors are corrected/normalized, "Here is an Amaz0n payment. Please send money using western unjon," would match the collection of terms, since "Amaz0n" once corrected would become "Amazon," and "unjon" would be corrected to "union" before the verification is made.

In some embodiments, a global list of equivalent terms is maintained (e.g., usable across multiple collections of terms), such as "USD," "us$," and "euro." While a Euro is not the same as a USD, the usage of either concept by a scammer is functionally the same. In some embodiments, as a message is evaluated (e.g., by content evaluation engine 208), it is first normalized by capitalization and spelling normalization, then the system replaces any terms found in the document matching a term in the list of equivalent terms with a representative term, such as the first term in the equivalence list. After that, the document is verified to determine if it matches any of the rules, such as the ("Amazon", "Western Union") rule. In some embodiments, any images included in/attached to/linked to in the message, are interpreted using OCR techniques, and any associated texts combined with ASCII text material before the verification is made.

In some embodiments, each of the non-equivalent terms in a collection of terms (e.g., "long lost" and "huge sum") are associated with one or more pointers, and ordered alphabetically. The number of pointers associated with each term is the same as the number of rules for which that term is used. Each rule is represented as a vector of Boolean values, where the vector has the same length as the associated rule contains words. All the binary values are set to false before a message is parsed. The message is parsed by reviewing word by word, starting with the first word. If the word being reviewed does not fully or partially match any of the alphabetically ordered terms, then the next word is reviewed instead. If a word matches a term fully, then all Boolean values that are pointed to by the pointers associated with the term that the word matches are set to true. If one or more words matches a term partially by being the first words in the term, then the next word of the message is being added to the comparison and it is determined whether the previously partially matching words now partially of fully match any of the terms that was previously partially matched. If a full match is achieved, then the Boolean values associated with the pointers of this term are set to true. If a partial match is achieved, then the next word is added, and the process repeated. If a sequence of words being matched first partially matches and then does not match, then the system again will consider one word, starting with the second word of the previous sequence. After the entire document has been parsed in this manner, the system determines whether any of the vectors of Boolean values is all true, and if this is so, then the algorithm outputs that there is a match; otherwise it outputs that there is no match. A match means that the message is dangerous. This comparison can also be made each time a Boolean value is set to true by determining if the vector in which this Boolean value is an element is all true, and it so, output "match" and conclude the processing of the message. In a variant implementation, the system determines how many of the vectors are set to all-true; and outputs a counter corresponding to this number. Alternatively, each vector is associated with a weight, and the system determines the sum of all the weights for which the associated vectors are all-true. The message is then identified as having dangerous content, and the sum determines the extent of the danger. In one embodiment, the Boolean vectors are not set to all-false between the scan of two related messages that are part of a thread and sent to the same person. This provides detection capabilities in situations where information is dispersed over multiple related messages, which causes the thread of messages to be considered dangerous.

—Obtaining Collections of Terms—

Collections of terms 218, an example of which is depicted in FIG. 7A, can be included in platform 200 in a variety of ways. As one example, a human administrator (or contractor linguist, or other appropriate entity) can manually create a given collection (and optionally assign it a title, as applicable, such as "inheritance scam"), which can be stored for use by platform 200. As another example, messages that are flagged (e.g., by human reviewers) as being fraudulent, but are not otherwise flagged by platform 200 can be examined—either automatically, or in cooperation with humans, such as an administrator or reviewers, and collections of terms formulated to identify such fraudulent messages in the future.

Figure 9:
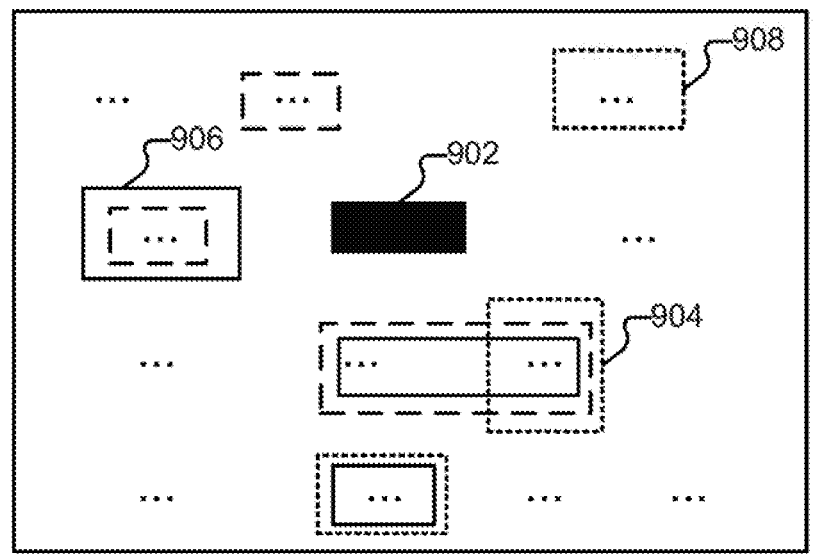
FIG. 9 illustrates an example of an interface configured to receive feedback usable to create collections of terms.

FIG. 9 illustrates an example of an interface configured to receive feedback usable to create collections of terms. In the example shown, an administrator is reviewing feedback provided by three reviewers about why a particular message is believed to be fraudulent. Specifically, while interacting with an interface such as a modified version of interface 5B, reviewers were asked to indicate which terms they believed were most important in reaching their determination of bad, by highlighting the terms prior to clicking "bad" button 576.

The terms selected by each of the three reviewers are indicated to the administrator as three types of boxes—sold boxes indicate a selection by a first reviewer; dashed boxes indicate a selection by a second reviewer; and dotted boxes indicate a selection by a third reviewer. In the example shown in FIG. 9, the administrator is not authorized to see the full message, so certain terms (e.g., term 902) are redacted, even for the administrator. All three reviewers agree that term 904 is probative of why the message is fraudulent. Other terms have votes from only two (e.g., 906) or just one (e.g., 908) of the reviewers. In various embodiments, the administrator can review the selections made by the reviewers, and act, e.g., as a fourth reviewer, to pick which terms should be included in a collection of terms usable to detect the scam represented by the message. The administrator can also set thresholds (e.g., minimum of two votes needed, reviewer reputation score needed, etc.) for automatically selecting terms, and then retain the ability to approve or veto the automatic inclusion of the collection of terms in collection 218. In some embodiments, the flagging of terms in the message is presented to users as a CAPTCHA.

In some embodiments, automated techniques are used to generate collections of terms (and/or indicating terms). For example, suppose the classification of a given message is "bad." Platform 200 can be configured to identify terms that distinguish it from messages of the good message set, using the TF-IDF (term frequency inverse document frequency) principle. A limited number of such terms are selected, where the number is either a system parameter or a function of the TF-IDF value, and where the terms are selected in order of decreasing TF-IDF values; while selecting at least a threshold number of word terms; at least a threshold number of bigrams; and at least a threshold number of trigrams. These selected terms are stored, and referred to as temporary terms. Platform 200 then computes a modified TF-IDF value for the normalized message and messages of the good message set, using constellations of the temporary terms, where a constellation is an unordered list of elements selected from the temporary terms, for different such selections. This identifies collections of elements from the set of temporary terms that are particularly rare in good messages. A threshold number of the resulting terms are kept, selected in order of decreasing modified TF-IDF value. The threshold is either a parameter number or a function of the modified TF-IDF number. The result are rules that identifies the input message as bad, and the inverse of the modified TF-IDF number is an estimate of the false positive rate for classification of messages using the associated rule. These rules are then ordered in terms of decreasing values of a counter measuring how many messages in the collection of known bad messages that each such rule matches. These counters are estimates of how general the associated rule is. One or more rules are selected from the rules, where the selection criteria are low false positive rates and large degree of generality. An example selection picks the rule that maximizes a measure equaling the generality measure divided by the false positive rate, i.e., the associated counter times the associated modified TF-IDF value. The selected rules are added to the database of rules. This approach is used to compute new rules to identify bad messages. In one version of the algorithm, the entire set of known good messages is used in place of the at least one message that is part of the input.

As another example, collections of terms can be generated using artificial intelligence techniques configured to identify common words in scam messages, but which are not as common in desirable messages; identify collections of such words that are frequent in scam messages but which are highly infrequent in desirable messages; and identify collections of such terms that are common in scam messages but which are essentially absent in desirable messages.

—Temporal Considerations—

The disclosed techniques can take into consideration temporal relationships between messages when making an assessment. For example, platform 200 can be configured to scan sequences of messages forming a conversation. It may be that one of the messages in the sequence does not have sufficient evidence of being abusive, whereas a sequence of such messages collectively provides sufficient evidence to be filtered out as being bad. This will cause any future emails of the same type or in the same sequence to also be considered bad.

Figure 10:
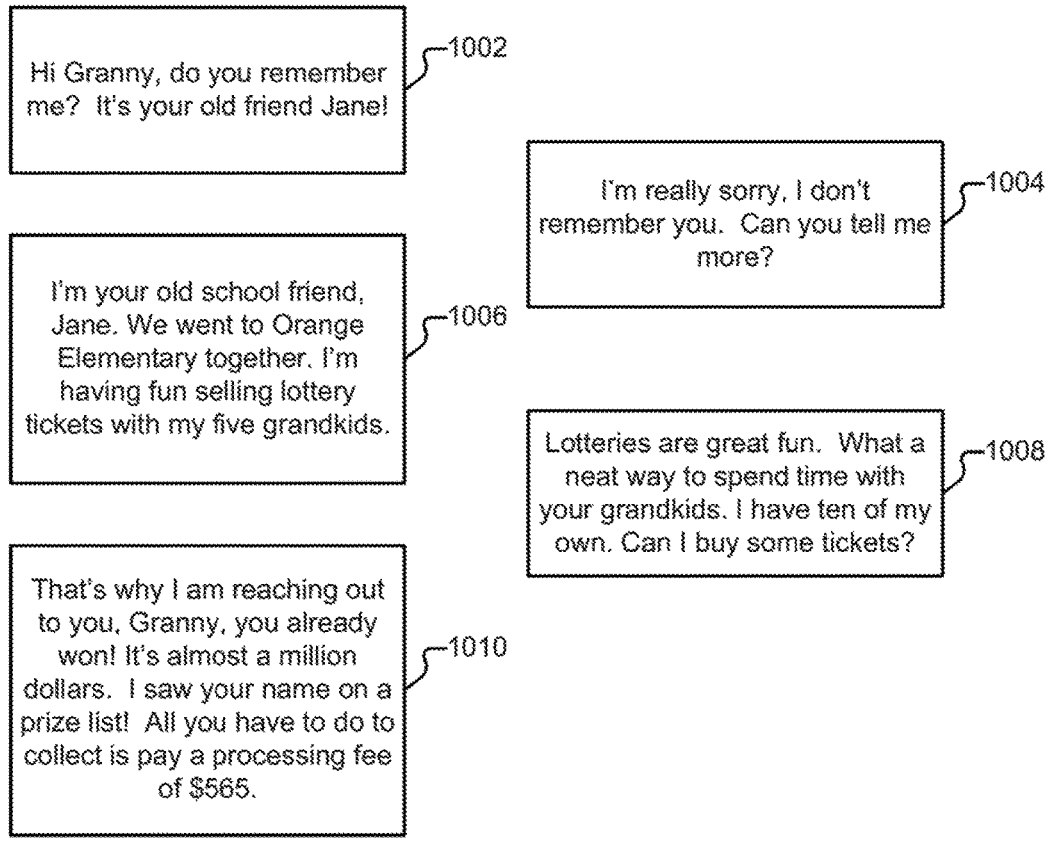
FIG. 10 illustrates an example of such a sequence of messages.

FIG. 10 illustrates an example of such a sequence of messages. In the first message (1002), a user called "Grandma" receives a seemingly benign email from someone claiming to be a long lost friend. It does not mention lotteries. Grandma responds (1004) that she cannot remember her friend, then gets a second email (1006) saying that they were in the same elementary school, and now her friend sells lottery tickets and has five grandchildren. Grandma responds (1008) that this sounds like a fun thing to do, and that she has ten grandchildren. Her "long lost friend" then says (1110) that the reason she contacted Grandma was that she saw her name as one of the lottery winners, and remembered her name from her childhood, then decided to find her to tell her about her winnings. How could she not pick up the money, it is nearly a million dollars, and all she has to do is to pay the processing fee of $565.

Each email in the exchange, by itself, might be seen as innocuous, with the potential exception message 1110. By the time message 1110 is received, however, most existing spam filters would have whitelisted the scammer, given the number of emails sent and received from her by Grandma without incident. In various embodiments, platform 200 examines the entire sequence of emails (or a moving window of several emails), concatenating the text together and performing analysis on the concatenated text. The concatenated text would readily match a "Lottery Scam" collection of words, and the messages would be classified as "bad," accordingly.

A second example of temporal processing is as follows. Suppose a user is receiving a sequence of emails over a few weeks time, where the sequence of emails establishes an online friendship or relationship, and then asks for money for some purpose. The initial sequence of emails is purely intended to establish trust, after which the typical request for money arrives. A person who has seen such a scam perpetrated might recognize its making from the early emails. A machine learning component (e.g., of content evaluation engine 208) can identify a sequence of messages as bad when identifying the request for money, and then identify indications in the trust-establishing emails that are indicative—whether by themselves or as a subsequence—of the request to come. This way, the machine learning component will constitute an early-warning system in which indications of fraud are picked up before there are signs that by themselves correspond to an effort to extract money.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain information associated with a plurality of electronic communications between a first entity and a second entity;
perform a first determination that the number of communications in the plurality of electronic communications exceeds a first threshold;
perform a second determination that the plurality of electronic communications were exchanged during a period of time that exceeds a second threshold;
receive an electronic communication to be classified; and
perform a classification of the received electronic communication based at least in part on the first determination and the second determination, wherein performing the classification includes assigning to the received electronic communication a single one of three different classifications according to a tertiary classification scheme, wherein the three classifications include good, bad, and undetermined;
based at least in part on the bad or undetermined classification, change the appearance of the received electronic communication by at least one of: redacting a first portion of the received electronic communication, textually or visually clarifying the received electronic communication, highlighting a second portion of the received electronic communication, and marking the message as highly suspicious;
wherein the one or more processors are further configured to perform an action based at least in part on the bad or undetermined classification, wherein the action comprises at least one of:
delivering the received electronic communication in a folder selected based at least in part on the classification, delivering the received electronic communication to an account selected based at least in part on the classification,
holding the received electronic communication in a repository,
forwarding the received electronic communication to a remote classifier, and
forwarding the received electronic communication for human review, wherein a reputation score is maintained for a human reviewer, and wherein the reputation score indicates a review accuracy of the human reviewer; and
a memory coupled to the one or more processors and configured to provide the one or more processors with instructions.

2. The system of claim 1, wherein the classification is performed based at least in part on a given email address.

3. The system of claim 1, wherein the classification is performed based at least in part on whether the received electronic communication is associated with a benign service provider.

4. The system of claim 1, wherein the classification is performed based at least in part on whether the received electronic communication is associated with an indication of sender spoofing.

5. The system of claim 1, wherein the classification is performed based at least in part on information associated with a honeypot engine, wherein the honeypot engine is configured to collect fraudulent messages and corresponding sender information at least in part by generating traffic from one or more honeypot accounts, collecting the traffic, and evaluating the traffic.

6. The system of claim 1, wherein the classification is performed based at least in part on a friendly location.

7. The system of claim 6, wherein the classification is performed based at least in part on a friendly email address.

8. The system of claim 6, wherein the friendly location is indicated at least in part by at least one of IP blocks or subnets, a political designation, and a distance from a given location.

9. A method, comprising:
obtaining information associated with a plurality of electronic communications between a first entity and a second entity;
perform a first determination that the number of communications in the plurality of electronic communications exceeds a first threshold;
perform a second determination that the plurality of electronic communications were exchanged during a period of time that exceeds a second threshold;
receive an electronic communication to be classified; and
performing, using one or more processors, a classification of the received electronic communication based at least in part on a determination of whether the received electronic communication corresponds to an entry in the whitelist, wherein performing the classification includes assigning to the received electronic communication a single one of three different classifications according to a tertiary classification scheme, wherein the three classifications include good, bad, and undetermined;
based at least in part on the bad or undetermined classification, changing the appearance of the received electronic communication by at least one of: redacting a first portion of the received electronic communication, textually or visually clarifying the received electronic communication, highlighting a second portion of the received electronic communication, and marking the message as highly suspicious;
wherein the one or more processors are further configured to perform an action based at least in part on the bad or undetermined classification, wherein the action comprises at least one of:
delivering the received electronic communication in a folder selected based at least in part on the classification, delivering the received electronic communication to an account selected based at least in part on the classification,
holding the received electronic communication in a repository,
forwarding the received electronic communication to a remote classifier, and
forwarding the received electronic communication for human review, wherein a reputation score is maintained for a human reviewer, and wherein the reputation score indicates a review accuracy of the human reviewer.

10. The method of claim 9, wherein the classification is based at least in part on a given email address.

11. The method of claim 9, wherein the classification is performed based at least in part on whether the received electronic communication is associated with a benign service provider.

12. The method of claim 9, wherein the classification is performed based at least in part on whether the received electronic communication is associated with an indication of sender spoofing.

13. The method of claim 9, wherein the classification is performed based at least in part on information associated with a honeypot engine, wherein the honeypot engine is configured to collect fraudulent messages and corresponding sender information at least in part by generating traffic from one or more honeypot accounts, collecting the traffic, and evaluating the traffic.

14. The method of claim 9, wherein the classification is based at least in part on a friendly location.

15. The method of claim 14, wherein the friendly location is associated with a friendly email address.

16. The method of claim 14, wherein the friendly location is indicated at least in part by at least one of IP blocks or subnets, a political designation, and a distance from a given location.

17. A system, comprising:
one or more processors configured to:
receive at least one whitelist entry;
receive an electronic communication to be classified; and
perform a classification of the received electronic communication based at least in part on a determination of whether the received electronic communication corresponds to an entry in the whitelist, wherein performing the classification includes assigning to the received electronic communication a single one of three different classifications according to a tertiary classification scheme, wherein the three classifications include good, bad, and undetermined;
based at least in part on the bad or undetermined classification, change the appearance of the received electronic communication by at least one of: redacting a first portion of the received electronic communication, textually or visually clarifying the received electronic communication, highlighting a second portion of the received electronic communication, and marking the message as highly suspicious;
wherein the one or more processors are further configured to perform an action based at least in part on the bad or undetermined classification, wherein the action comprises at least one of:
delivering the received electronic communication in a folder selected based at least in part on the classification, delivering the received electronic communication to an account selected based at least in part on the classification,
holding the received electronic communication in a repository,
forwarding the received electronic communication to a remote classifier, and
forwarding the received electronic communication for human review, wherein a reputation score is maintained for a human reviewer, and wherein the reputation score indicates a review accuracy of the human reviewer; and
a memory coupled to the one or more processors and configured to provide the one or more processors with instructions.

18. The system of claim 17 wherein the at least one whitelist entry is provided by at least one of a user and an administrator.

19. The system of claim 17 wherein the at least one whitelist entry is automatically generated by obtaining information associated with a plurality of electronic communications between a first entity and a second entity; performing a first determination that the number of communications in the plurality of electronic communications exceeds a first threshold; performing a second determination that the plurality of electronic communications were exchanged during a period of time that exceeds a second threshold; and creating the at least one whitelist entry from information associated with the first entity.

20. A method, comprising:
    receiving at least one whitelist entry;
    receiving an electronic communication to be classified; and
    performing, using one or more processors, a classification of the received electronic communication based at least in part on a determination of whether the received electronic communication corresponds to an entry in the whitelist, wherein performing the classification includes assigning to the received electronic communication a single one of three different classifications according to a tertiary classification scheme, wherein the three classifications include good, bad, and undetermined;
    based at least in part on the bad or undetermined classification, changing the appearance of the received electronic communication by at least one of: redacting a first portion of the received electronic communication, textually or visually clarifying the received electronic communication, highlighting a second portion of the received electronic communication, and marking the message as highly suspicious;
    wherein the one or more processors are further configured to perform an action based at least in part on the performed bad or undetermined classification, wherein the action comprises at least one of:
      delivering the received electronic communication in a folder selected based at least in part on the classification, delivering the received electronic communication to an account selected based at least in part on the classification,
      holding the received electronic communication in a repository,
      forwarding the received electronic communication to a remote classifier, and
      forwarding the received electronic communication for human review, wherein a reputation score is maintained for a human reviewer, and wherein the reputation score indicates a review accuracy of the human reviewer.

21. The method of claim 20 wherein the at least one whitelist entry is provided by at least one of a user and an administrator.

22. The method of claim 20 wherein the at least one whitelist entry is automatically generated by obtaining information associated with a plurality of electronic communications between a first entity and a second entity; performing a first determination that the number of communications in the plurality of electronic communications exceeds a first threshold; performing a second determination that the plurality of electronic communications were exchanged during a period of time that exceeds a second threshold; and creating the at least one whitelist entry from information associated with the first entity.

23. A computer program product embodied in a non-transitory computer readable storage medium and comprising computer instructions for:
    obtaining information associated with a plurality of electronic communications between a first entity and a second entity;
    perform a first determination that the number of communications in the plurality of electronic communications exceeds a first threshold;
    perform a second determination that the plurality of electronic communications were exchanged during a period of time that exceeds a second threshold;
    receive an electronic communication to be classified; and
    performing, using one or more processors, a classification of the received electronic communication based at least in part on a determination of whether the received electronic communication corresponds to an entry in the whitelist, wherein performing the classification includes assigning to the received electronic communication a single one of three different classifications according to a tertiary classification scheme, wherein the three classifications include good, bad, and undetermined;
    based at least in part on the bad or undetermined classification, changing the appearance of the received electronic communication by at least one of: redacting a first portion of the received electronic communication, textually or visually clarifying the received electronic communication, highlighting a second portion of the received electronic communication, and marking the message as highly suspicious;
    wherein the one or more processors are further configured to perform an action based at least in part on the bad or undetermined classification, wherein the action comprises at least one of:
      delivering the received electronic communication in a folder selected based at least in part on the classification, delivering the received electronic communication to an account selected based at least in part on the classification,
      holding the received electronic communication in a repository,
      forwarding the received electronic communication to a remote classifier, and
      forwarding the received electronic communication for human review, wherein a reputation score is maintained for a human reviewer, and wherein the reputation score indicates a review accuracy of the human reviewer.

* * * * *